(12) United States Patent
Aoi

(10) Patent No.: US 8,254,036 B2
(45) Date of Patent: Aug. 28, 2012

(54) ZOOM LENS AND IMAGING APPARATUS

(75) Inventor: Toshihiro Aoi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/193,103

(22) Filed: Jul. 28, 2011

(65) Prior Publication Data

US 2012/0026604 A1   Feb. 2, 2012

(30) Foreign Application Priority Data

Jul. 29, 2010   (JP) .................................. 2010-169991

(51) Int. Cl.
  *G02B 15/14*   (2006.01)
(52) U.S. Cl. ......... 359/687; 359/715; 359/740; 359/774
(58) Field of Classification Search .................. 359/687, 359/715, 740, 774
See application file for complete search history.

(56) References Cited

U.S. PATENT DOCUMENTS

| | | | |
|---|---|---|---|
| 7,599,124 B2 * | 10/2009 | Li et al. .......................... | 359/687 |
| 2004/0169934 A1 | 9/2004 | Oomura et al. | |
| 2005/0180024 A1 | 8/2005 | Toyama | |
| 2005/0219709 A1 | 10/2005 | Wakazono | |
| 2006/0018035 A1 | 1/2006 | Takatsuki | |
| 2007/0058264 A1 | 3/2007 | Yakita | |
| 2008/0239504 A1 | 10/2008 | Tsutsumi | |
| 2009/0086321 A1 | 4/2009 | Mizuguchi et al. | |

FOREIGN PATENT DOCUMENTS

| | | |
|---|---|---|
| EP | 1582902 | 10/2005 |
| EP | 1975666 | 10/2008 |
| JP | 2001356381 | 12/2001 |
| JP | 2006-039005 | 2/2006 |
| JP | 2008-241884 | 10/2008 |

OTHER PUBLICATIONS

Extended European Search Report dated Oct. 21, 2011, Application No. 11175628.4.

* cited by examiner

*Primary Examiner* — Evelyn A. Lester
(74) *Attorney, Agent, or Firm* — Young & Thompson

(57) ABSTRACT

A zoom lens includes a positive first lens group, a negative second lens group, a positive third lens group, and a positive fourth lens group, which are arranged in this order from the object side of the zoom lens. The focal length of the entire system of the zoom lens is changeable by changing a distance between the second lens group and the third lens group. The first lens group includes two cemented lenses, each composed of a negative meniscus lens and a positive lens cemented together in this order from the object side, and a positive lens, and the two cemented lenses and the positive lens being arranged in this order from the object side. Further, a predetermined formula related to the focal length of the first lens group and the focal length of the entire system is satisfied.

8 Claims, 16 Drawing Sheets

FIG.4A  EXAMPLE 1
WIDE ANGLE END
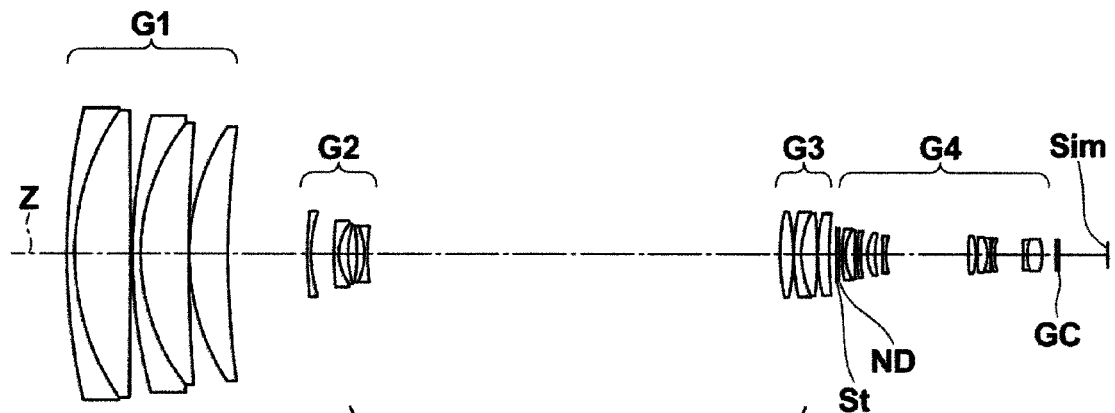
FIG.4B
TELEPHOTO END
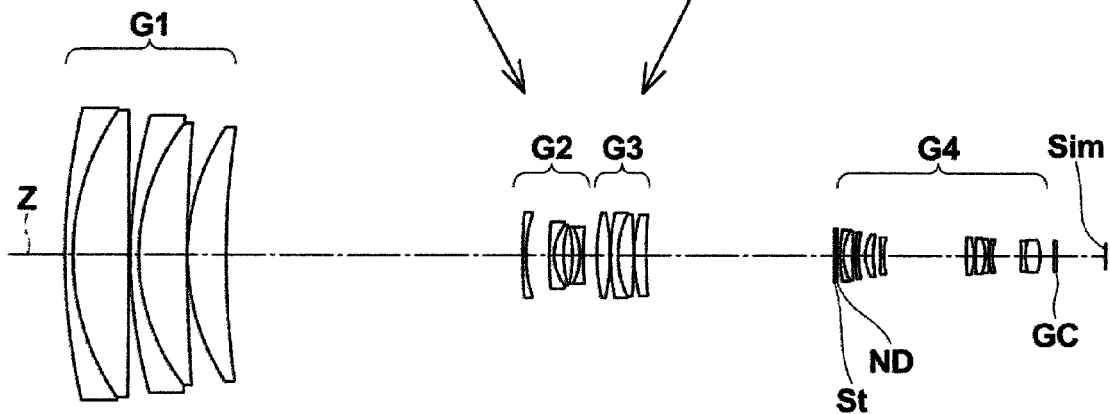

EXAMPLE 2

WIDE ANGLE END

TELEPHOTO END

FIG.6A  EXAMPLE 3
WIDE ANGLE END
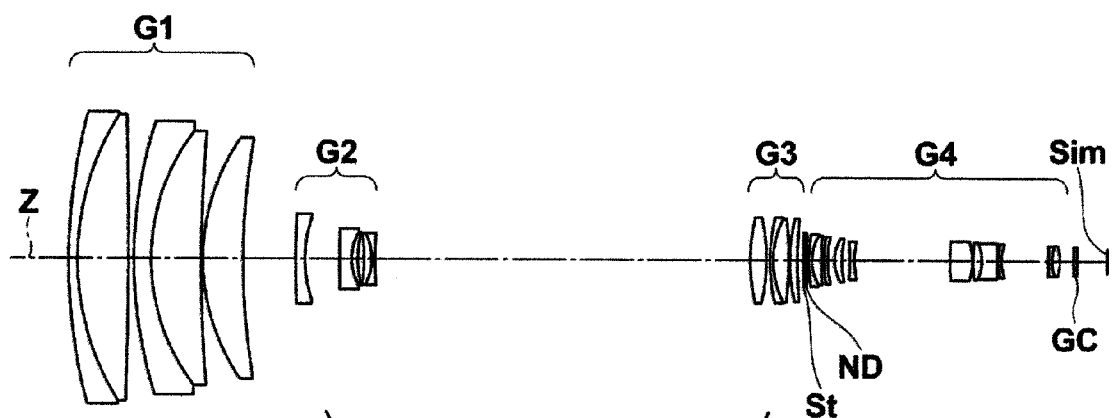
FIG.6B
TELEPHOTO END
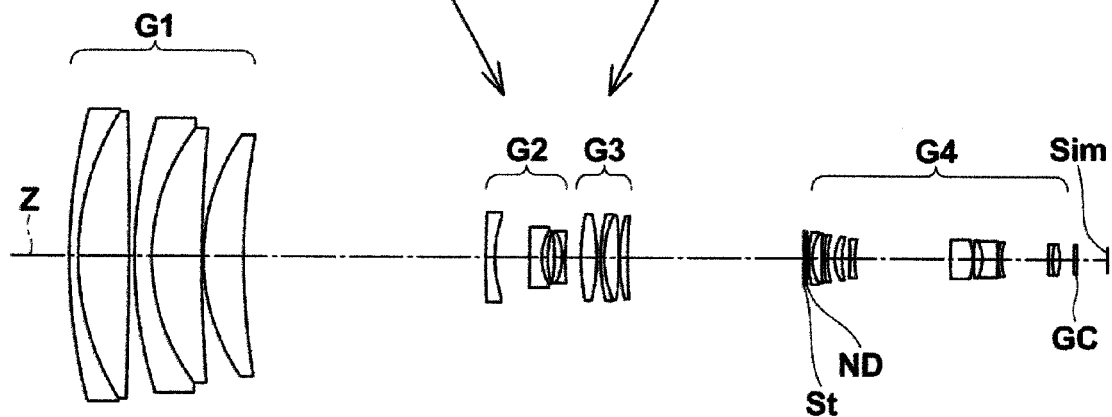

EXAMPLE 4

WIDE ANGLE END

TELEPHOTO END

EXAMPLE 5

WIDE ANGLE END

TELEPHOTO END

EXAMPLE 1

WIDE ANGLE END

MIDDLE

TELEPHOTO END

EXAMPLE 2

WIDE ANGLE END

SPHERICAL ABERRATION

ASTIGMATISM

DISTORTION

LATERAL CHROMATIC ABERRATION

MIDDLE

SPHERICAL ABERRATION

ASTIGMATISM

DISTORTION

LATERAL CHROMATIC ABERRATION

TELEPHOTO END

SPHERICAL ABERRATION

ASTIGMATISM

DISTORTION

LATERAL CHROMATIC ABERRATION

EXAMPLE 3

WIDE ANGLE END

MIDDLE

TELEPHOTO END

EXAMPLE 4

EXAMPLE 5
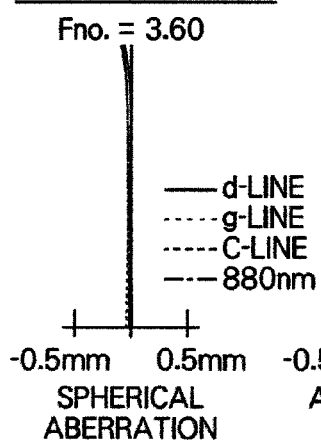
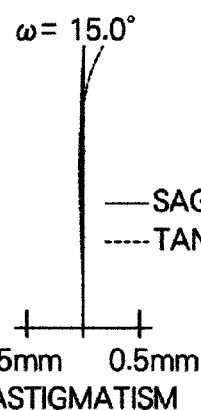
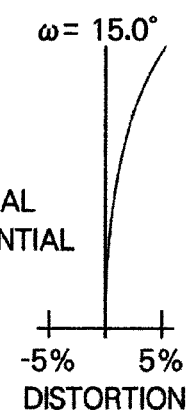
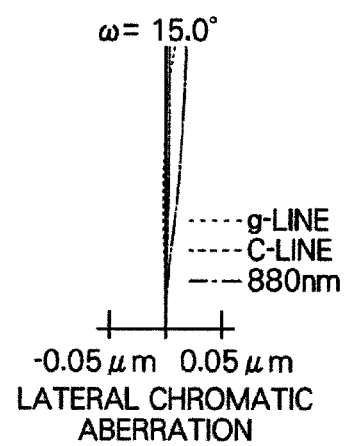
FIG.13A     FIG.13B     FIG.13C     FIG.13D
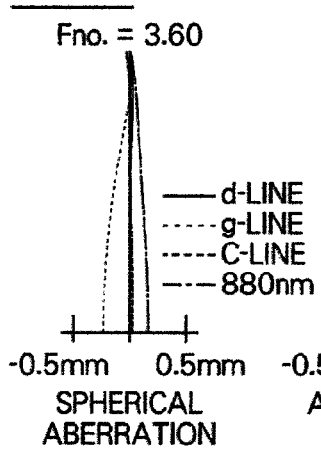
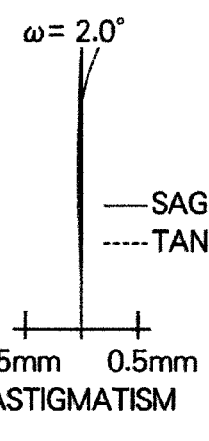
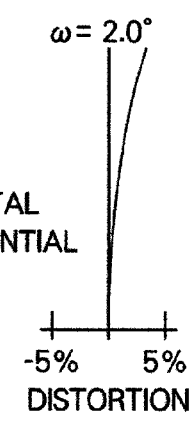
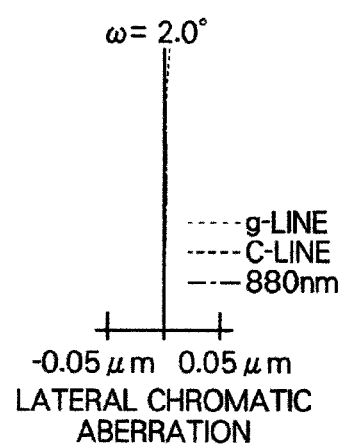
FIG.13E     FIG.13F     FIG.13G     FIG.13H
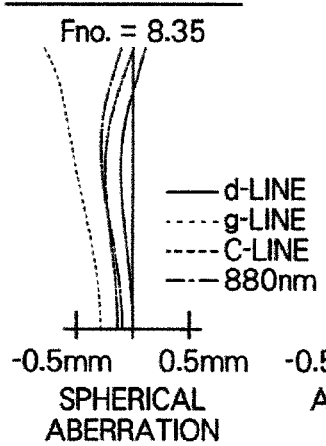
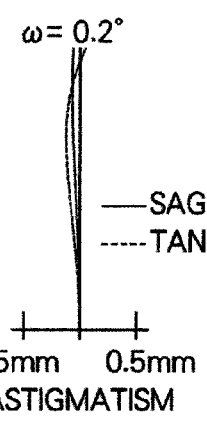
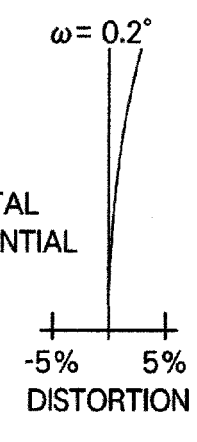
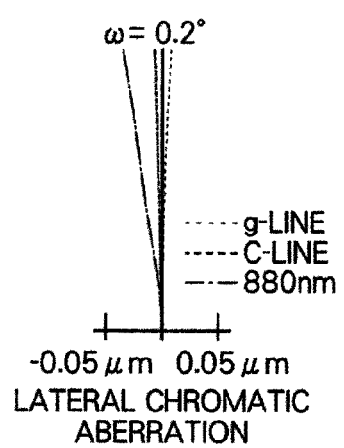
FIG.13I     FIG.13J     FIG.13K     FIG.13L

EXAMPLE 1 + EXTENDER

WIDE ANGLE END

TELEPHOTO END

EXAMPLE 2 + EXTENDER

WIDE ANGLE END

TELEPHOTO END

ZOOM LENS AND IMAGING APPARATUS

BACKGROUND OF THE INVENTION

1. Field of the Invention

The present invention relates to a zoom lens and an imaging apparatus. In particular, the present invention relates to a zoom lens having a high variable magnification ratio, and which is appropriate for use in a surveillance camera for monitoring a long distance area, and to an imaging apparatus including the zoom lens.

2. Description of the Related Art

Conventionally, zoom lenses were used as optical systems for surveillance video cameras to monitor or observe long distance areas at harbors or the like. The zoom lenses used for such a purpose need to have high variable magnification ratios of at least 50 times and high performance. Further, such zoom lenses need to cope with wavelengths in a near-infrared region to perform photography at night or in a dense fog. Further, since the zoom lenses are high magnification optical systems, it is desirable that anti-vibration functions are provided.

As the zoom lenses having high variable magnification ratios, and which are appropriate for video cameras for monitoring long distance areas, for example, U.S. Patent Application Publication No. 2006018035 (Patent Document 1) discloses a zoom lens having a variable magnification ratio of approximately 60 times. This lens system is composed of a positive first lens group, a negative second lens group, a positive third lens group, and a negative fourth lens group. Further, magnification is changeable by moving the second lens group and the third lens group along the optical axis of the zoom lens. Further, U.S. Patent Application Publication No. 2008239504 (Patent Document 2) discloses a zoom lens having a variable magnification ratio of approximately 20 times. In the lens system disclosed in Patent Document 2, aberrations, especially chromatic aberrations, are corrected in an excellent manner by appropriately setting the arrangement of refractive powers in the first lens group, Abbe numbers or the like.

The zoom lens disclosed in Patent Document 1 achieves a high variable magnification ratio. However, to satisfy a demand for a high-performance zoom lens of recent years, correction of aberrations, especially correction of chromatic aberrations at telephoto end, needs to be improved. Meanwhile, the zoom lens disclosed in Patent Document 2 has high performance, but the variable magnification ratio is approximately 20 times. Therefore, a higher variable magnification ratio is desirable when the zoom lens is used to monitor a long distance area in surveillance operations at harbors or the like. As described above, it is difficult to provide an optical system that has excellent performance through the entire variable magnification range while achieving a high variable magnification ratio, and that is usable in a wavelength band of visible light to near-infrared light. Further, the size of an optical system tends to become large to satisfy these requests at the same time. However, in recent years, the compactness of an apparatus became strongly requested.

SUMMARY OF THE INVENTION

In view of the foregoing circumstances, it is an object of the present invention to provide a zoom lens having a high variable magnification ratio and high performance, and which is usable in a wavelength band of visible light to near-infrared light without causing the size of the lens system to become large. Further, it is another object of the present invention to provide an imaging apparatus including the zoom lens.

A zoom lens of the present invention is a zoom lens comprising:

a first lens group having positive refractive power;
a second lens group having negative refractive power;
a third lens group having positive refractive power; and
a fourth lens group having positive refractive power, which are arranged in this order from the object side of the zoom lens, wherein the focal length of the entire system of the zoom lens is changed by moving, along the optical axis of the zoom lens, the second lens group and the third lens group in such a manner to change a distance therebetween, and wherein the first lens group includes two cemented lenses, each composed of a negative meniscus lens, which is a negative lens, and a positive lens cemented together in this order from the object side, and a positive lens, and the two cemented lenses and the positive lens being arranged in this order from the object side, and wherein the following formula (1) is satisfied:

$$0.14 < fG1/ft < 0.26 \quad (1), \text{where}$$

fG1 is the focal length of the first lens group, and
ft is the focal length of the entire system at telephoto end.

In each of the two cemented lenses in the first lens group of the zoom lens of the present invention, the negative meniscus lens and the positive lens are cemented together in this order from the object side of the zoom lens.

In the zoom lens of the present invention, the first lens group may consist of five lenses (in other words, the first lens group may be composed of only five lenses) that are the cemented lens composed of the negative meniscus lens and the positive lens cemented together in this order from the object side, the cemented lens composed of the negative meniscus lens and the positive lens cemented together in this order from the object side, and the positive lens, and the two cemented lenses and the positive lens being arranged in this order from the object side.

In the zoom lens of the present invention, it is desirable that the following formulas (2) and (3) are satisfied:

$$\nu n > 48 \quad (2); \text{and}$$

$$\nu p > 75 \quad (3), \text{where}$$

$\nu n$ is an average value of the Abbe numbers of all of negative lenses included in the first lens group with respect to d-line, and
$\nu p$ is an average value of the Abbe numbers of all of positive lenses included in the first lens group with respect to d-line.

In the zoom lens of the present invention, it is desirable that when a most-object-side cemented lens of the cemented lenses, each composed of a negative meniscus lens and a positive lens cemented together, in the first lens group is a first cemented lens, and a cemented lens located at a second position from the object side of the cemented lenses in the first lens group is a second cemented lens, the following formulas (4) and (5) are satisfied:

$$\Delta\nu1 < 11 \quad (4); \text{and}$$

$$\Delta\nu2 > 50 \quad (5), \text{where}$$

$\Delta\nu1$ is the absolute value of a difference between the Abbe numbers of the negative meniscus lens and the positive lens constituting the first cemented lens with respect to d-line, and Δv2 is the absolute value of a difference between the Abbe numbers of the negative meniscus lens and the positive lens constituting the second cemented lens with respect to d-line.

In the zoom lens of the present invention, it is desirable that the fourth lens group includes a first negative lens group and a second negative lens group that is arranged on the image side of the first negative lens group. Further, it is desirable that the first negative lens group includes a positive lens and a negative lens. Further, it is desirable that the second negative lens group is moved in a direction perpendicular to the optical axis to compensate for a shake blur in a photography image. Further, it is desirable that the following formula (6) is satisfied:

$$1.5 < f4a/f4b < 3.5 \quad (6),$$

where f4a is the focal length of the first negative lens group, and f4b is the focal length of the second negative lens group.

Further, the second lens group in the zoom lens of the present invention may have 3-group 5-element construction in which a negative meniscus lens, a cemented lens composed of a negative lens and a positive lens cemented together in this order from the object side, and a cemented lens composed of a positive lens and a negative lens cemented together in this order from the object side are arranged in this order from the object side.

In the zoom lens of the present invention, an extender that changes the focal length of the entire system of the zoom lens toward the long focus side by being inserted into the optical path of the zoom lens may be arranged, in a removable manner, immediately on the image side of the second negative lens group in the fourth lens group. The term "immediately" means that no optical member is arranged between the second negative lens group and the extender.

In the zoom lenses of the present invention, which are possible or desirable, the term "negative meniscus lens", the term "positive lens", and the term "negative lens" refer to paraxial regions of lenses when the lenses are aspheric lenses.

An imaging apparatus of the present invention includes any one of the aforementioned zoom lenses of the present invention.

A zoom lens of the present invention includes a positive first lens group, a negative second lens group, a positive third lens group, and a positive fourth lens group, which are arranged in this order from the object side of the zoom lens. Further, the focal length of the entire system of the zoom lens is changed by moving, along the optical axis of the zoom lens, the second lens group and the third lens group in such a manner to change a distance therebetween. In the zoom lens, the structure of the first lens group is appropriately set, and the formula (1) is satisfied. Therefore, the zoom lens has a high variable magnification ratio and high performance, and is usable in a wide wavelength band of visible light to near-infrared light without causing the size of the lens system to become large.

The imaging apparatus of the present invention includes a zoom lens of the present invention. Therefore, the imaging apparatus is compact, and is usable in a wide wavelength band of visible light to near-infrared light. Further, the imaging apparatus can obtain high-quality video images (images) at a high variable magnification ratio.

BRIEF DESCRIPTION OF THE DRAWINGS

FIG. 4A is a cross section illustrating a zoom lens in Example 1 of the present invention at wide angle end;

FIG. 4B is a cross section illustrating a zoom lens in Example 1 of the present invention at telephoto end;

FIG. 6A is a cross section illustrating a zoom lens in Example 3 of the present invention at wide angle end;

FIG. 6B is a cross section illustrating a zoom lens in Example 3 of the present invention at telephoto end;

FIGS. 13A through 13L are diagrams illustrating various aberrations of the zoom lens in Example 5 of the present invention;

DESCRIPTION OF THE PREFERRED EMBODIMENTS

Figure 1:
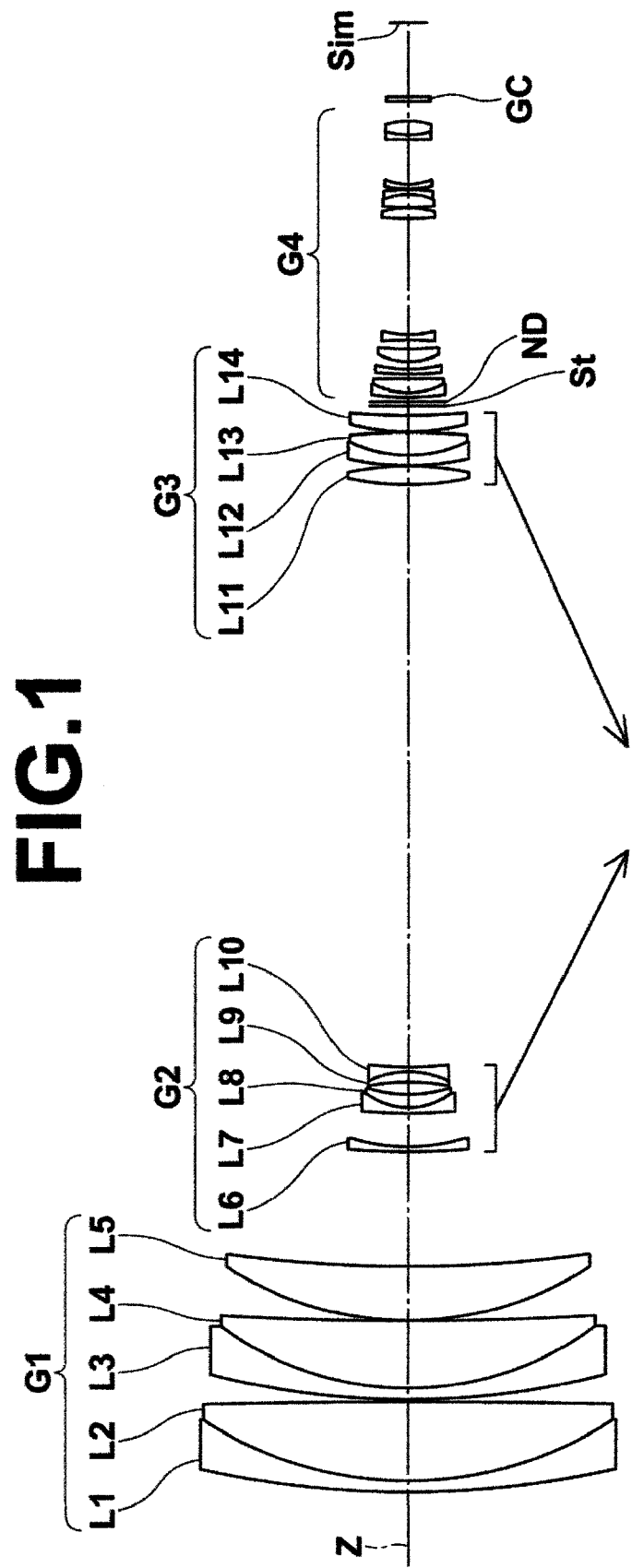
FIG. 1 is a cross section illustrating the structure of a zoom lens according to an embodiment of the present invention.

Hereinafter, embodiments of the present invention will be described in detail with reference to drawings. First, a zoom lens according to an embodiment of the present invention will be described with reference to FIG. 1. FIG. 1 is a cross section illustrating an example of the composition of a zoom lens according to an embodiment of the present invention. FIG. 1 corresponds to a zoom lens in Example 1, which will be described later. In FIG. 1, the left side is the object side of the zoom lens, and the right side is the image side of the zoom lens. FIG. 1 illustrates arrangement of lenses at wide angle end when the zoom lens is focused on an object at infinity.

The zoom lens according to this embodiment includes first lens group G1 having positive refractive power, second lens group G2 having negative refractive power, third lens group G3 having positive refractive power, and fourth lens group G4 having positive refractive power, which are arranged along optical axis Z in this order from the object side of the zoom lens. In the zoom lens illustrated in FIG. 1, aperture stop St and ND filter ND are arranged between the third lens group G3 and the fourth lens group G4, and the aperture stop St is fixed when the magnification of the zoom lens is changed. The aperture stop St illustrated in FIG. 1 does not necessarily represent the size nor the shape of the aperture stop St, but a position at which the aperture stop St is located on the optical axis Z.

The ND filter ND is not an essential element in the zoom lens of the present invention. However, for example, when the ND filter ND has a density distribution in the direction of the diameter thereof from a point on the optical axis, it is possible to reduce a fluctuation in the illumination intensity at an image plane caused by the change in magnification.

This zoom lens can achieve a high variable magnification ratio of approximately 60 times, and is appropriate for use in a surveillance camera for monitoring along distance area at harbors or the like. When the zoom lens is applied to an imaging apparatus, it is desirable that a cover glass, various filters or the like is arranged between the optical system and image plane Sim based on the structure of a camera on which the zoom lens is mounted. In FIG. 1, parallel-flat-plate-shaped optical member GC, which is assumed to be such elements, is arranged between the fourth lens group G4 and the image plane Sim.

The magnification of this zoom lens is changeable by continuously changing the focal length of the entire system of the zoom lens by moving, along the optical axis Z, the second lens group G2 and the third lens group G3 in such a manner to change a distance therebetween. FIG. 1 schematically illustrates the paths of movement of the second lens group G2 and the third lens group G3 when magnification is changed from wide angle end to telephoto end. Arrows under the second lens group G2 and the third lens group G3 schematically indicate the paths of movements of these lens groups, respectively. Meanwhile, the first lens group G1 and the fourth lens group G3 are fixed with respect to the direction of the optical axis when magnification is changed.

The first lens group G1 includes a cemented lens composed of lens L1 that is a negative meniscus lens and lens L2 that is a positive lens, which are cemented together in this order from the object side, a cemented lens composed of lens L3 that is a negative meniscus lens and lens L4 that is a positive lens, which are cemented together in this order from the object side, and lens L5 that is a positive lens. The two cemented lenses and the positive lens are arranged in this order from the object side. The first lens group G1 may further include a lens or lenses. However, a reduction in the size of the zoom lens is considered, it is desirable that the first lens group G1 has 3-group 5-element construction in which the aforementioned five lenses are arranged.

The construction of the first lens group G1 including two cemented lenses, each composed of a positive lens and a negative lens, is advantageous to correction of chromatic aberrations. Further, since each lens having regulated power and shape is arranged in the aforementioned order in the first lens group G1, more flexible correction of aberrations is possible, compared with an optical system described as an example in Patent Document 1. In the present invention, it is possible to correct longitudinal chromatic aberrations including a residual secondary spectrum at telephoto end, correction of which in a high-magnification zoom lens is difficult, and aberrations at a reference wavelength in a well-balanced manner. Further, it is possible to provide a high-performance optical system that is usable in a wide wavelength band of visible light to near-infrared light.

Specifically, for example, the first lens group G1 may have 3-group 5-element construction in which a cemented lens composed of a negative meniscus lens having a convex surface facing the object side and a double-convex lens cemented together in this order from the object side, a cemented lens composed of a negative meniscus lens having a convex surface facing the object side and a positive meniscus lens having a convex surface facing the object side cemented together in this order from the object side, and a positive meniscus lens having a convex surface facing the object side are arranged in this order from the object side.

This zoom lens is structured in such a manner to satisfy the following formula (1):

$$0.14 < fG1/ft < 0.26 \tag{1}$$

where fG1 is the focal length of the first lens group G1, and ft is the focal length of the entire system at telephoto end.

The formula (1) regulates the ratio of the focal length of the first lens group G1 to the focal length of the entire system at telephoto end. When the value of fG1/ft is lower than the lower limit defined by the formula (1), the refractive power of the first lens group G1 becomes strong. Then, negative spherical aberrations at telephoto end increase, and that is not desirable because correction of aberrations becomes difficult. When the value of fG1/ft exceeds the upper limit defined by the formula (1), a zoom stroke for obtaining desirable magnification becomes long. Consequently, the size of the optical system becomes large, and that is not desirable.

It is more desirable that the following formula (1-1) is satisfied:

$$0.16 < fG1/ft < 0.24 \tag{1-1}$$

When the formula (1-1) is satisfied, an even better effect is achievable, compared with the case of satisfying the formula (1).

Further, in this zoom lens, it is desirable that formulas (2) and (3) are satisfied:

$$vn > 48 \tag{2}$$

and $$vp > 75 \tag{3}$$

where vn is an average value of the Abbe numbers of all of negative lenses included in the first lens group G1 with respect to d-line, and vp is an average value of the Abbe numbers of all of positive lenses included in the first lens group G1 with respect to d-line.

The formula (2) regulates the Abbe numbers of the negative lenses in the first lens group G1, and the formula (3) regulates the Abbe numbers of the positive lenses in the first lens group G1. To provide a zoom lens having a high variable magnification ratio and high performance, and which can be used in imaging with near-infrared light, it is necessary that the residual secondary spectrum is small, and that the fluctuation amount of chromatic aberrations is small even when magnification is changed at high variable magnification ratio. For that purpose, it is desirable that both of the materials of the positive lenses and the materials of the negative lenses have large Abbe numbers. When the value of vn is lower than the lower limit defined by the formula (2) and the value of vp is lower than the lower limit defined by the formula (3), the residual secondary spectrum of longitudinal chromatic aberrations increases, and a chromatic blur is generated in an obtained image. Therefore, it becomes difficult to obtain an excellent image.

It is more desirable that the following formula (2-1) is satisfied:

$$48 < \nu n < 60 \quad (2\text{-}1).$$

When the value of νn exceeds the upper limit defined by the formula (2-1), the difference between the average value of the Abbe numbers of the positive lenses and the average value of the Abbe numbers of the negative lenses becomes too small, and primary achromatization becomes difficult.

It is more desirable that the following formula (2-2) is satisfied:

$$50 < \nu n < 58 \quad (2\text{-}2).$$

When the formula (2-2) is satisfied, an even better effect is achievable, compared with the case of satisfying the formula (2-1).

With respect to the formula (3), it is more desirable that the following formula (3-1) is satisfied:

$$\nu p > 78 \quad (3\text{-}1).$$

When the formula (3-1) is satisfied, an even better effect is achievable, compared with the case of satisfying the formula (3).

Further, in this zoom lens, it is desirable that when a most-object-side cemented lens of the cemented lenses, each composed of a negative meniscus lens and a positive lens cemented together, in the first lens group G1 is a first cemented lens, and a cemented lens located at a second position from the object side of the cemented lenses in the first lens group G1 is a second cemented lens, the following formulas (4) and (5) are satisfied:

$$\Delta \nu 1 < 11 \quad (4)\text{; and}$$

$$\Delta \nu 2 > 50 \quad (5)\text{, where}$$

Δν1 is the absolute value of a difference between the Abbe numbers of the negative meniscus lens and the positive lens constituting the first cemented lens with respect to d-line, and Δν2 is the absolute value of a difference between the Abbe numbers of the negative meniscus lens and the positive lens constituting the second cemented lens with respect to d-line.

The first cemented lens in the first lens group G1 corrects chromatic aberrations, and aberrations, especially spherical aberrations, at a reference wavelength on the telephoto side. The second cemented lens in the first lens group G1 mainly corrects chromatic aberrations on the telephoto side. When the value of Δν1 exceeds the upper limit defined by the formula (4), a fluctuation amount of chromatic aberrations becomes large. Further, when the first cemented lens is composed of a combination of a negative meniscus lens and a positive lens made of optical materials exceeding the upper limit defined by the formula (4), it becomes difficult to correct aberrations at a reference wavelength in an excellent manner. When the value of Δν2 is lower than the lower limit defined by the formula (5), it becomes difficult to correct chromatic aberrations, especially chromatic aberrations on the telephoto side, in an excellent manner.

With respect to the formulas (4) and (5), it is more desirable that the following formulas (4-1) and (5-1) are satisfied:

$$\Delta \nu 1 < 9 \quad (4\text{-}1)\text{; and}$$

$$\Delta \nu 2 > 52 \quad (5\text{-}1).$$

When the formulas (4-1) and (5-1) are satisfied, even better effects are achievable, compared with the cases of satisfying the formulas (4) and (5), respectively.

For example, the second lens group G2 may have 3-group 5-element construction in which a negative meniscus lens, a cemented lens composed of a negative lens and a positive lens cemented together in this order from the object side, and a cemented lens composed of a positive lens and a negative lens cemented together in this order from the object side are arranged in this order from the object side. When the second lens group G2 is structured in such a manner, it is possible to correct various aberrations through the entire variable magnification range in an excellent manner, while the size of the zoom lens is reduced by using a minimum number of lenses in the second lens group G2. Especially, it is possible to easily correct longitudinal chromatic aberrations and lateral chromatic aberrations in the range of a middle focal length to telephoto end.

More specifically, the second lens group G2 may have 3-group 5-element construction, for example, as illustrated in FIG. 1. In FIG. 1, lens L6, a cemented lens composed of lenses L7 and L8 cemented together in this order from the object side, and a cemented lens composed of lenses L9 and L10 cemented together in this order from the object side are arranged in this order from the object side. The lens L6 is a negative meniscus lens having a convex surface facing the object side. The lens L7 is a negative meniscus lens having a convex surface facing the object side, and the lens L8 is a positive meniscus lens having a convex surface facing the object side. The lens L9 is a positive meniscus lens having a convex surface facing the image side, and the lens L10 is a double-concave lens. The second lens group G2, which is a movable group, includes two cemented lenses, each composed of a positive lens and a negative lens, and uses many meniscus lenses. Such structure of the second lens group G2 is advantageous to correction of chromatic aberrations. Further, it is possible to correct various aberrations through the entire variable magnification range in an excellent manner.

The third lens group G3 may have 3-group 4-element construction, for example, as illustrated in FIG. 1. In FIG. 1, lens L11, a cemented lens composed of lenses L12 and L13 cemented together in this order from the object side, and a lens L14 are arranged in this order from the object side. The lens L11 is a double-convex lens. The lens L12 is a negative meniscus lens having a convex surface facing the object side, and the lens L13 is a double-convex lens. The lens L14 is a positive meniscus lens having a convex surface facing the object side.

Figure 2:
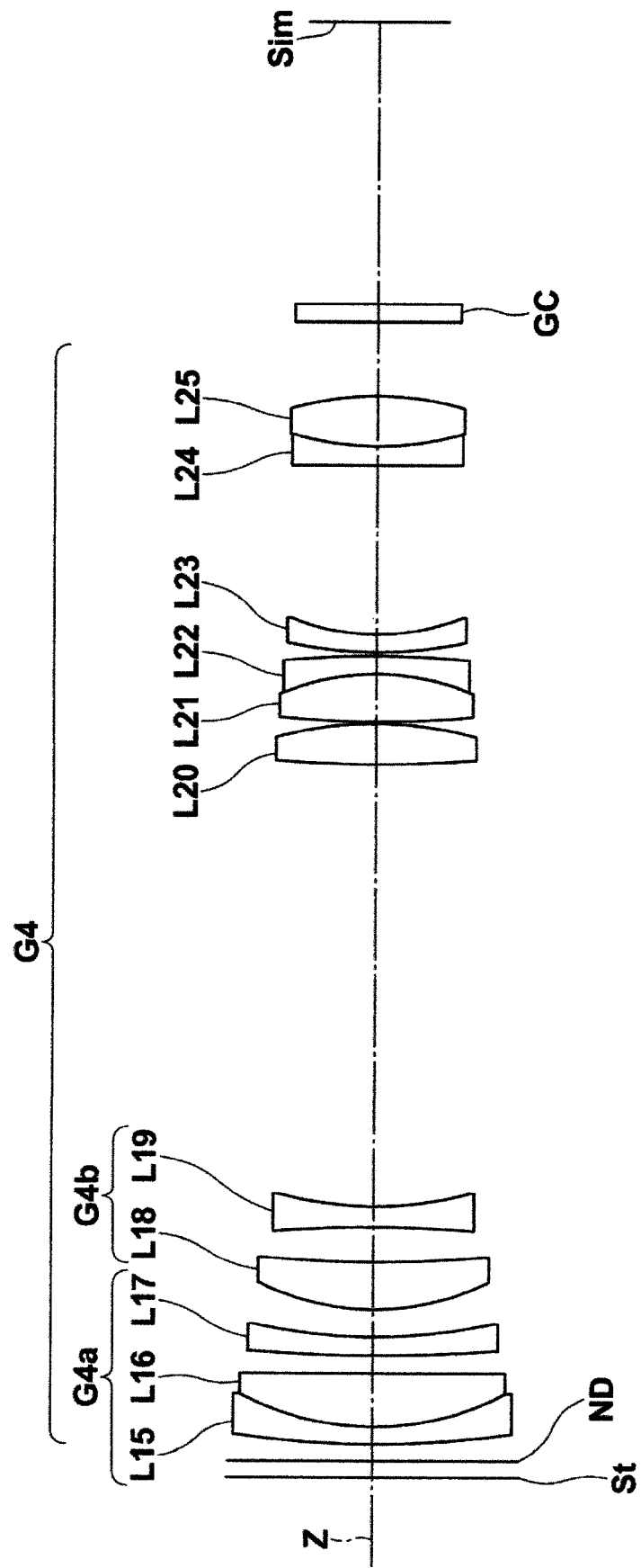
FIG. 2 is a cross section illustrating the structure of a fourth lens group illustrated in FIG. 1.

FIG. 2 is an enlarged diagram illustrating fourth lens group G4 and the vicinity thereof in the zoom lens illustrated in FIG. 1. In an example illustrated in FIG. 2, the fourth lens group G4 has 8-group 11-element construction composed of lenses L15 through L25.

It is desirable that the fourth lens group G4 includes first negative lens group G4a and second negative lens group G4b that is arranged on the image side of the first negative lens group G4a. Further, it is desirable that the first negative lens group G4a includes at least one positive lens and at least one negative lens, and has negative refractive power as a whole. It is desirable that the second negative lens group G4b has an anti-vibration function for compensating for a shake blur in a photography image by being moved in a direction perpendicular to optical axis Z, and that the second negative lens group G4b has negative refractive power as a whole.

Further, as described later, it is desirable that an extender is inserted into the fourth lens group G4 to increase the variable magnification ratio. Further, it is desirable that parallel rays of light enter the extender so that a larger error in the position of the extender with respect to the direction of the optical axis is allowable when the extender is inserted. Generally, the rays of light output from the third lens group G3 are convergent rays. Therefore, it is desirable that the lens group positioned between the third lens group G3 and the extender has negative refractive power as a whole.

When a distance between the third lens group G3 and the first negative lens group G4a in the fourth lens group G4 becomes long, the height of rays entering the first negative lens group G4a becomes low. Therefore, the refractive power of each lens constituting the first negative lens group G4a becomes strong to obtain a desirable exit angle of view, and an allowable error in production becomes small, and that is not desirable. Similarly, when a distance between the first negative lens group G4a and the second negative lens group G4b in the fourth lens group G4 becomes long, the height of rays entering the second negative lens group G4b becomes low. Therefore, the refractive power of each lens constituting the second negative lens group G4b becomes strong to obtain a desirable exit angle of view, and an allowable error in production becomes small, and that is not desirable.

Therefore, it is desirable that the first negative lens group G4a is located on the most object side in the fourth lens group G4. Further, it is desirable that the second negative lens group G4b is located immediately on the image side of the first negative lens group G4a in the fourth lens group G4. Specifically, it is desirable that the first negative lens group G4a and the second negative lens group G4b are arranged between the third lens group G3 and a position at which the extender is inserted. As described above, it is desirable that the lens group located between the third lens group G3 and the extender has negative refractive power as a whole. If one of the first negative lens group G4a and the second negative lens group G4b is a positive lens group, the other lens group, which is a negative lens group, needs to have strong negative power to cancel the positive power of the positive lens group. Consequently, an allowable error in production becomes small, and that is not desirable. Therefore, it is desirable that both of the first negative lens group G4a and the second negative lens group G4b in the fourth lens group G4 are negative lens groups.

For example, as illustrated in FIG. 2, the first negative lens group G4a may have 2-group 3-element construction in which a cemented lens composed of lenses L15 and L16 cemented together in this order from the object side, and lens L17 are arranged in this order from the object side. The lens L15 is a negative meniscus lens having a convex surface facing the object side, and the lens L16 is a positive meniscus lens having a convex surface facing the object side. The lens L17 is a negative meniscus lens having a convex surface facing the object side.

For example, as illustrated in FIG. 2, the second negative lens group G4b may have 2-group 2-element construction in which lenses L18 and L19 are arranged in this order from the object side. The lens L18 is a positive meniscus lens having a convex surface facing the object side, and the lens L19 is a double-concave lens.

It is not necessary that the first negative lens group G4a and the second negative lens group G4b are structured as illustrated in FIG. 2. For example, the first negative lens group G4a may have one-group 2-element construction composed of a cemented lens. Further, the cemented lens may be composed of a negative meniscus lens having a convex surface facing the object side and a positive meniscus lens having a convex surface facing the object side cemented together in this order from the object side. Further, the second negative lens group G4b may have 3-group 3-element construction in which a negative meniscus lens having a convex surface facing the object side, a positive meniscus lens having a convex surface facing the object side, and a double-concave lens are arrange in this order from the object side.

When a cemented lens composed of a positive lens and a negative lens is arranged on the most object side in the first negative lens group G4a, a distance between this cemented lens and aperture stop St becomes short. Therefore, it becomes possible to correct longitudinal chromatic aberrations in an appropriate manner without substantially affecting lateral chromatic aberrations.

In the second negative lens group G4b, it is desirable that the lens group located on the object side of a negative single lens that is arranged on the most image side has positive refractive power. For example, in FIG. 2, it is desirable that lens L18, which is located on the object side of lens L19, is a positive lens. In the second negative lens group G4b, if the lens group located on the object side of the negative single lens that is arranged on the most image side has negative refractive power, rays of light output from this lens group located on the object side of the negative single lens are divergent rays. Therefore, the diameter of the negative single lens located on the most image side in the second negative lens group G4b becomes large, and the weight of the negative single lens becomes heavy. Consequently, a load on a drive system when the second negative lens group G4b is moved becomes large, and that is not desirable.

When the fourth lens group G4 includes first negative lens group G4a and second negative lens group G4b that is arranged on the image side of the first negative lens group G4a, and the first negative lens group G4a includes a positive lens and a negative lens, and the second negative lens group G4b is moved in a direction perpendicular to the optical axis to compensate for a shake blur in a photography image, it is desirable that the following formula (6) is satisfied:

$$1.5 < f4a/f4b < 3.5 \qquad (6),\text{ where}$$

f4a is the focal length of the first negative lens group G4a, and f4b is the focal length of the second negative lens group G4b.

The formula (6) regulates the ratio of the focal length of the first negative lens group G4a to the focal length of the second negative lens group G4b, which is movable in a direction perpendicular to the optical axis to achieve an anti-vibration function. When the value of f4a/f4b is lower than the lower limit defined by the formula (6), and the refractive power of the first negative lens group G4a becomes strong, the degree of divergence of rays by the first negative lens group G4a becomes high. Consequently, the size of the second negative lens group G4b becomes large, and the weight of the second negative lens group G4b becomes heavy. Therefore, quick anti-vibration control becomes difficult. When the value of f4a/f4b exceeds the upper limit defined by the formula (6), and the refractive power of the first negative lens group G4a becomes weak, the performance of the second negative lens group G4b greatly changes by a production error or an assembly error of lenses constituting the second negative lens group G4b. Therefore, the quality of images easily deteriorates, and that is not desirable.

Therefore, it is more desirable that the following formula (6-1) is satisfied instead of the formula (6):

$$1.8 < f4a/f4b < 3.2 \qquad (6\text{-}1).$$

When the formula (6-1) is satisfied, an even better effect is achievable, compared with the case of satisfying the formula (6).

Figure 3:
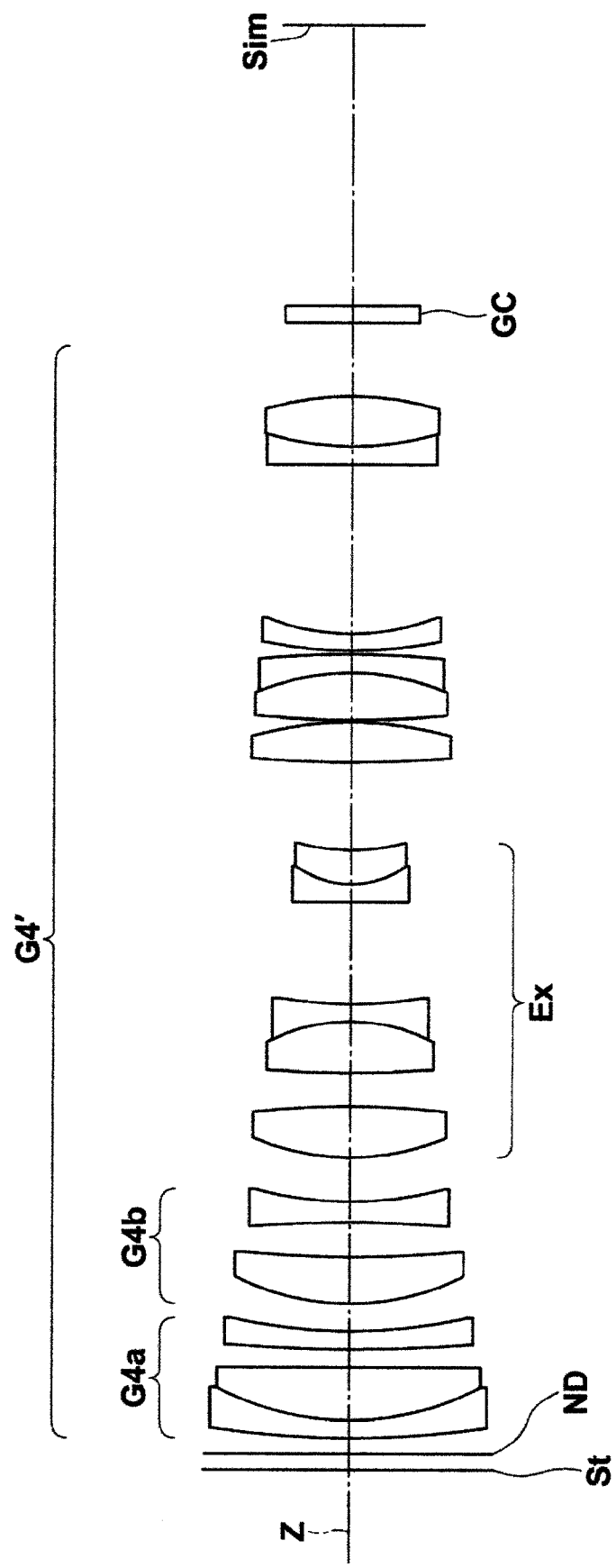
FIG. 3 is a cross section illustrating the structure of the fourth lens group illustrated in FIG. 2 when an extender is inserted into the fourth lens group.

In this zoom lens, an extender that changes the focal length of the entire system of the zoom lens toward the long focus side by being inserted into the optical path of the zoom lens may be arranged in a removable manner. In that case, it is desirable that the extender is arranged immediately on the image side of the second negative lens group G4b, as illustrated in FIG. 3. FIG. 3 is a cross section illustrating the structure of fourth lens group G4', in which extender Ex is inserted into the fourth lens group G4 illustrated in FIG. 2. The second negative lens group G4b, which is an anti-vibration group, and the extender need to be driven by a drive device or devices. Therefore, if a fixed group is arranged between the anti-vibration group and the extender, the mechanism becomes complex, and that is not desirable.

Further, when this zoom lens needs to be environment-resistant, in other words, to be resistant to tough conditions, it is desirable that the most-object-side lens in the entire system of the zoom lens is made of glass. When the zoom lens is used outdoors by being mounted on a surveillance camera or the like, the lens that is arranged on the most object side of the zoom lens is constantly exposed to sunlight. Therefore, if the most-object-side lens is a plastic glass, there is a risk that the quality of the most-object-side lens deteriorates or changes.

When this zoom lens is used in tough environment or conditions, it is desirable that a multi-layer coating for protection is applied. Further, an anti-reflection coating for reducing ghost light or the like may be applied alone or in addition to the coating for protection.

In the example illustrated in FIG. 1, optical member GC is arranged between the lens system and an image formation plane. A low-pass filter, various filters that cut specific wavelength bands or the like may be arranged as the optical member GC. Instead of arranging the filters between the lens system and the image formation plane, such filters may be arranged between lenses. Alternatively, a coating that has a similar action to the filters may be applied to a surface of one of the lenses.

Next, examples of numerical values of the zoom lens of the present invention will be described. FIGS. 4A and 4B are cross sections illustrating a zoom lens in Example 1. FIG. 4A illustrates the arrangement of lenses at wide angle end, and FIG. 4B illustrates the arrangement of lenses at telephoto end when the zoom lens is focused on an object at infinity. In FIGS. 4A and 4B, the left side is the object side, and the right side is the image side. In a manner similar to FIG. 1, aperture stop St, ND filter ND, and optical member GC are also illustrated in FIGS. 4A and 4B.

Figure 5A:
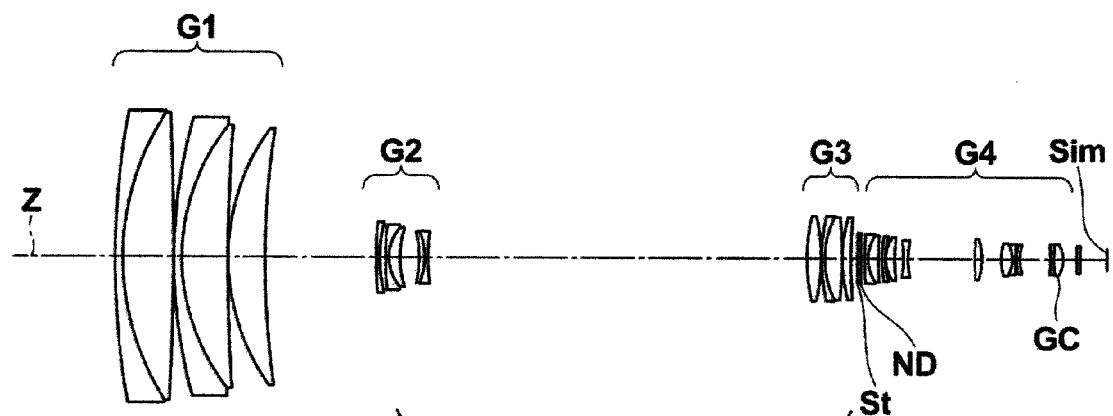
FIG. 5A is a cross section illustrating a zoom lens in Example 2 of the present invention at wide angle end.
Figure 5B:
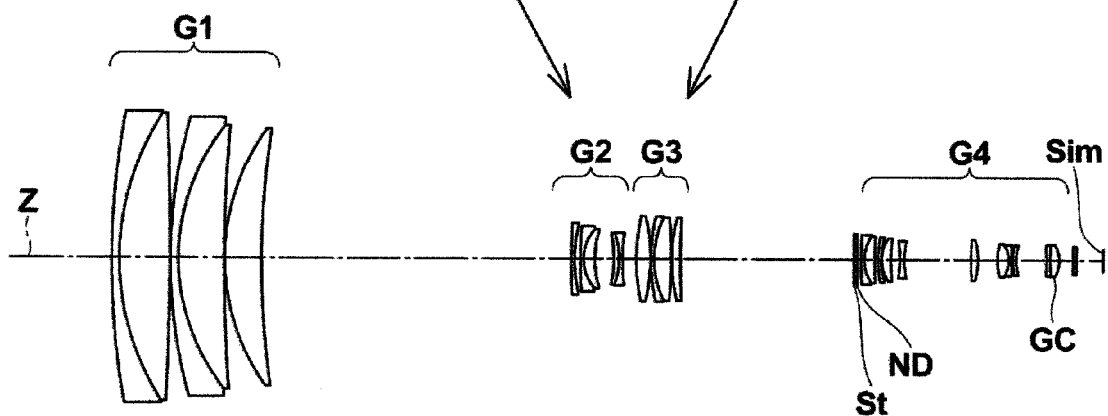
FIG. 5B is a cross section illustrating a zoom lens in Example 2 of the present invention at telephoto end.
Figure 7A:
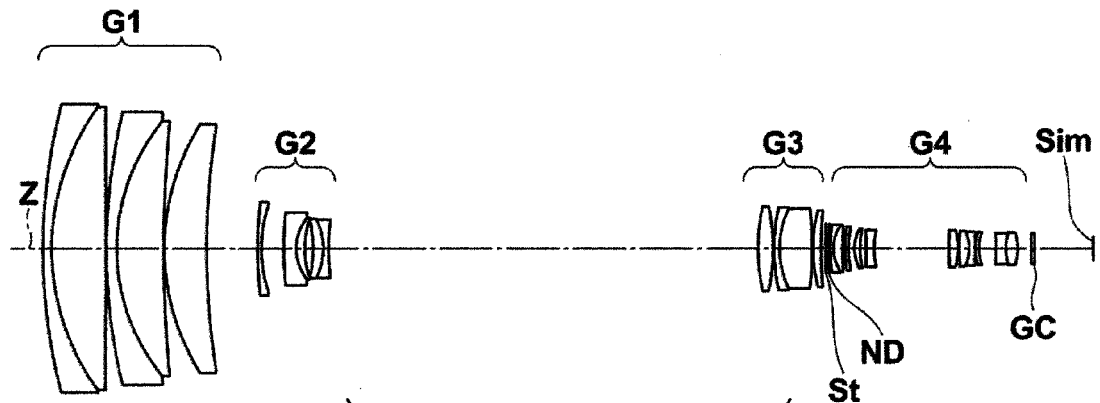
FIG. 7A is a cross section illustrating a zoom lens in Example 4 of the present invention at wide angle end.
Figure 7B:
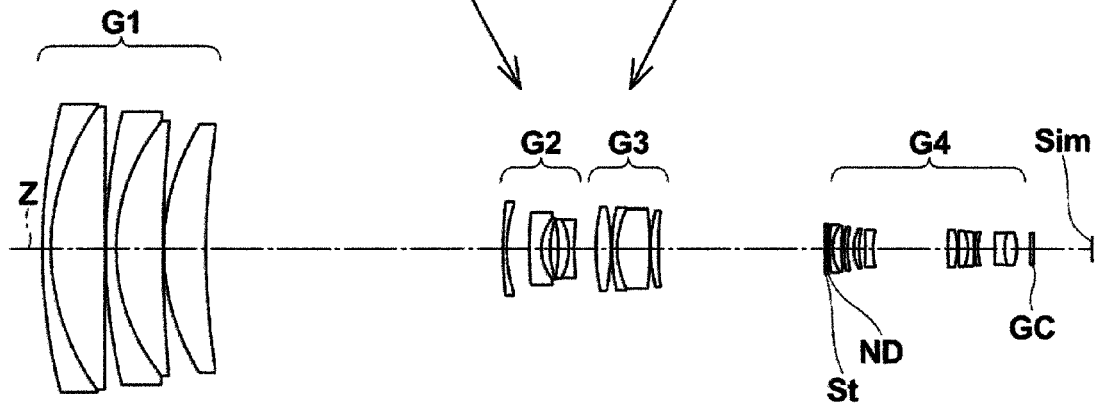
FIG. 7B is a cross section illustrating a zoom lens in Example 4 of the present invention at telephoto end.
Figure 8A:
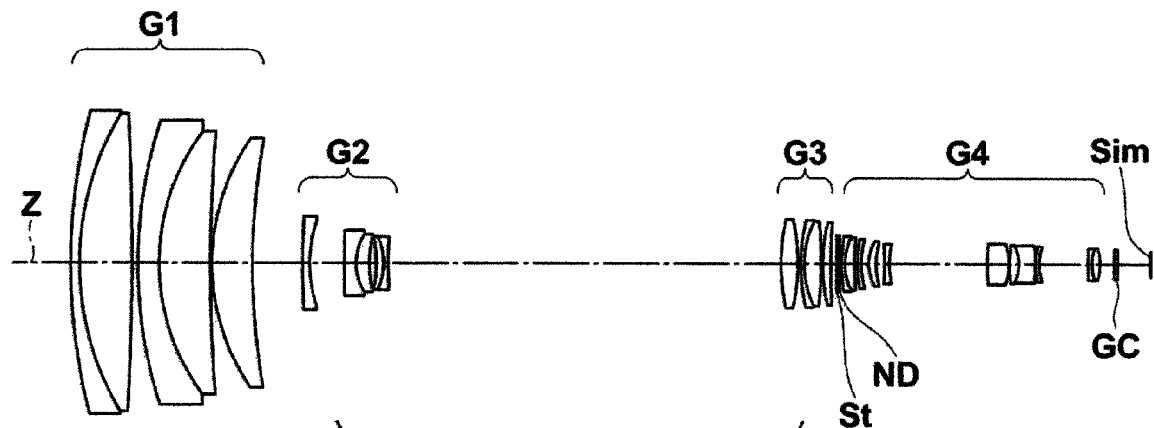
FIG. 8A is a cross section illustrating a zoom lens in Example 5 of the present invention at wide angle end.
Figure 8B:
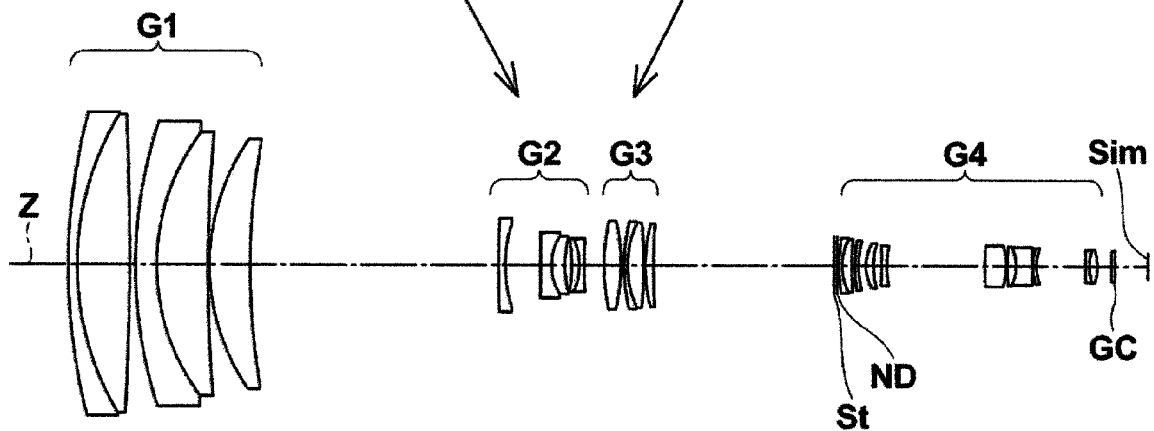
FIG. 8B is a cross section illustrating a zoom lens in Example 5 of the present invention at telephoto end.
Figure 9A:
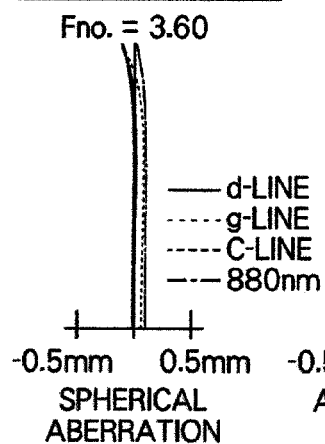
FIGS. 9A through 9L are diagrams illustrating various aberrations of the zoom lens in Example 1 of the present invention.
Figure 9B:
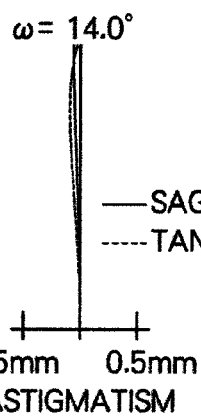
Figure 9C:
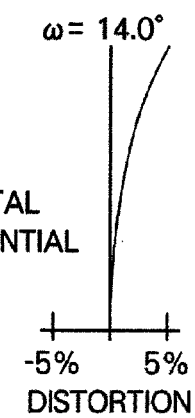
Figure 9D:
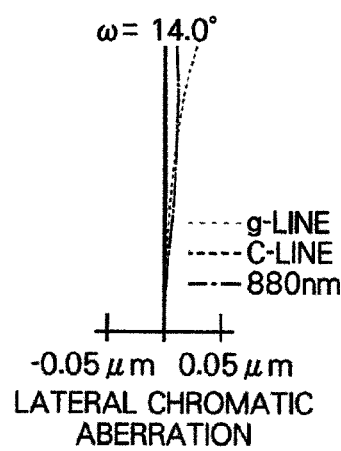
Figure 9E:
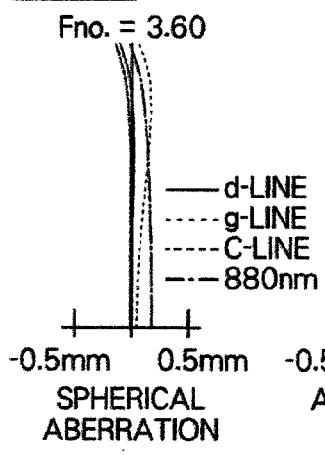
Figure 9F:
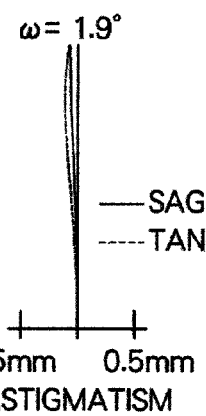
Figure 9G:
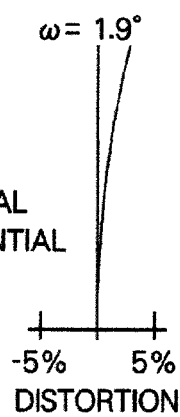
Figure 9H:
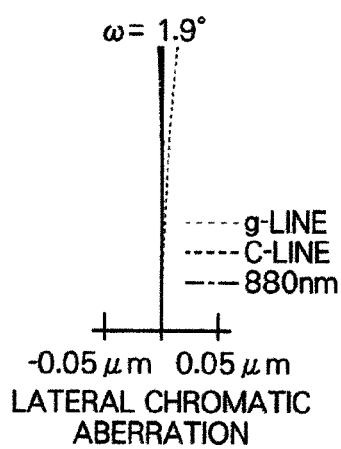
Figure 9I:
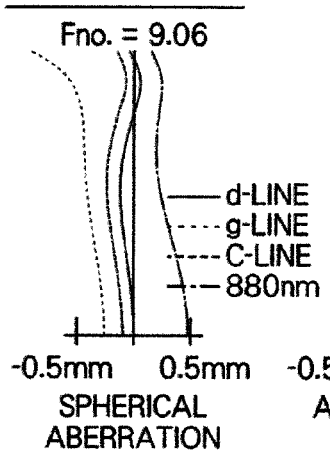
Figure 9J:
Figure 9K:
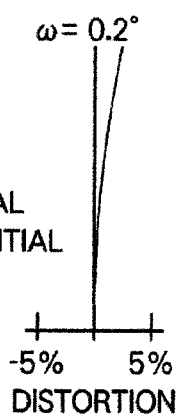
Figure 9L:
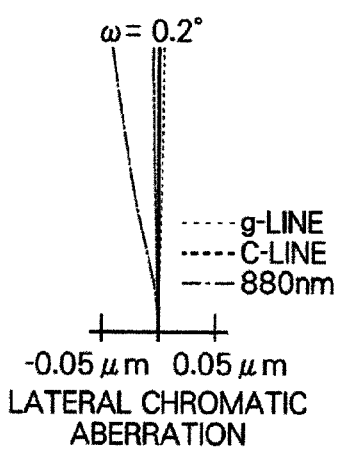
Figure 10A:
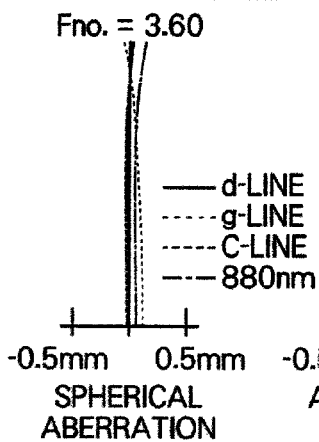
FIGS. 10A through 10L are diagrams illustrating various aberrations of the zoom lens in Example 2 of the present invention.
Figure 10B:
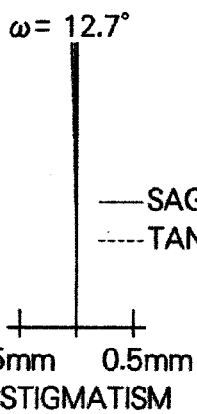
Figure 10C:
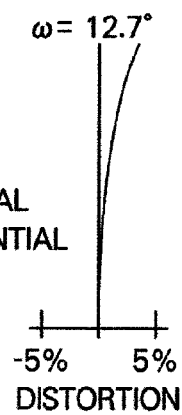
Figure 10D:
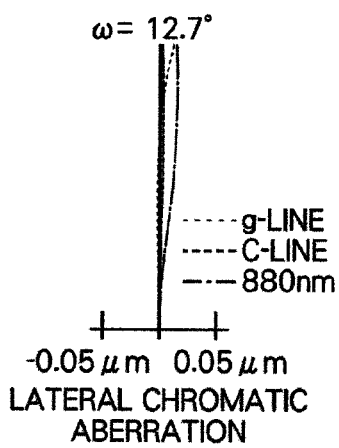
Figure 10E:
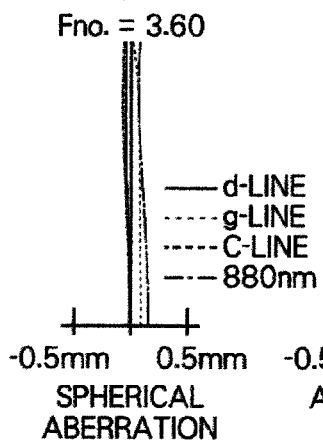
Figure 10F:
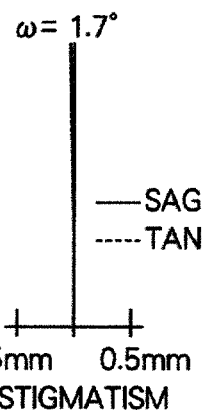
Figure 10G:
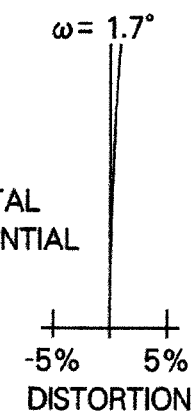
Figure 10H:
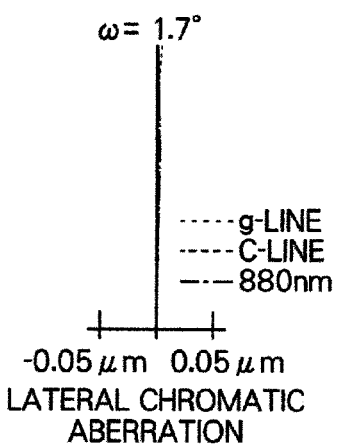
Figure 10I:
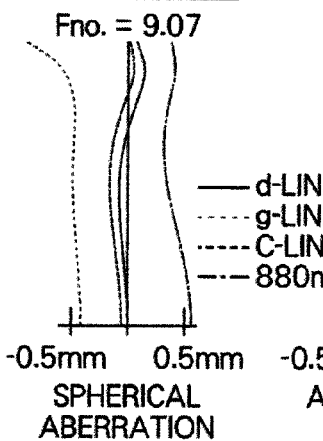
Figure 10J:
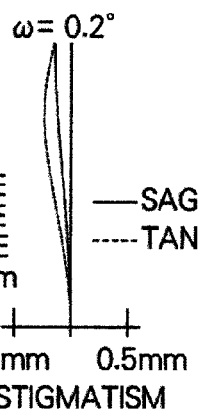
Figure 10K:
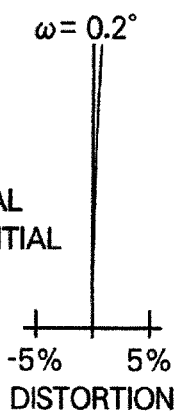
Figure 10L:
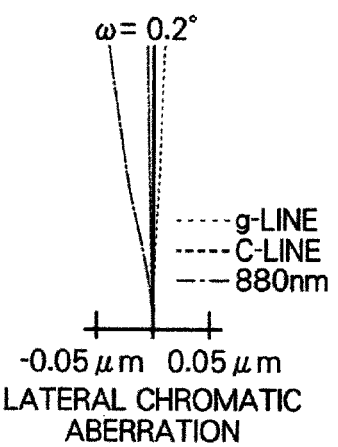
Figure 11A:
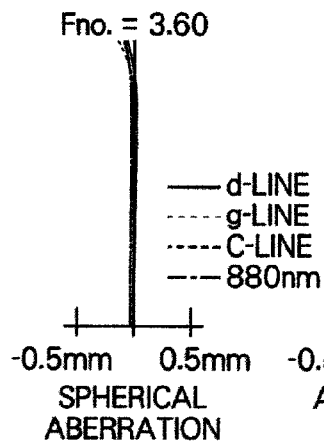
FIGS. 11A through 11L are diagrams illustrating various aberrations of the zoom lens in Example 3 of the present invention.
Figure 11B:
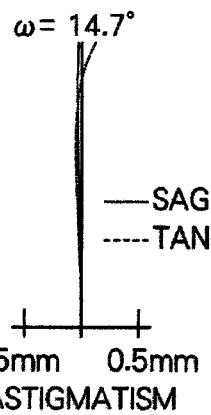
Figure 11C:
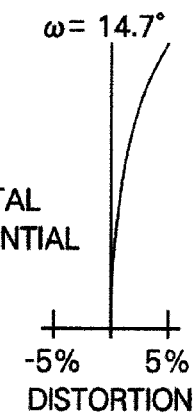
Figure 11D:
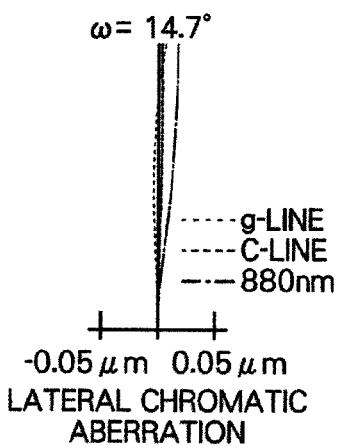
Figure 11E:
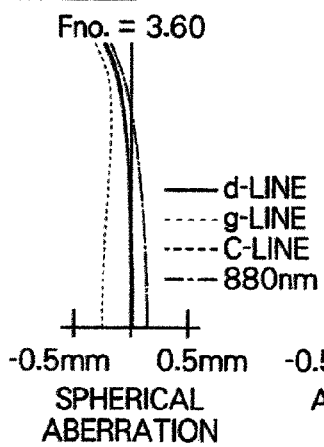
Figure 11F:
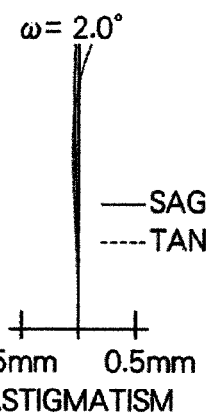
Figure 11G:
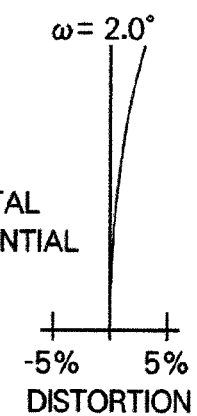
Figure 11H:
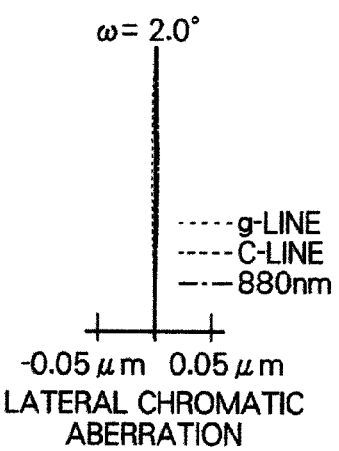
Figure 11I:
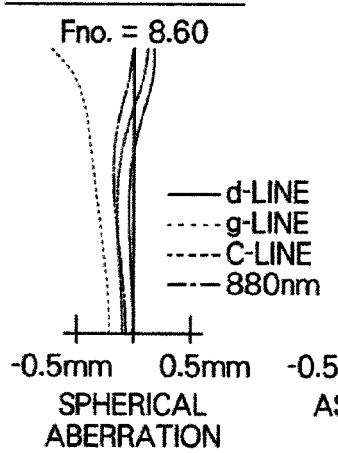
Figure 11J:
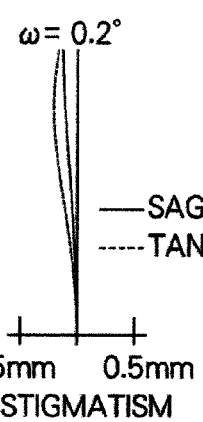
Figure 11K:
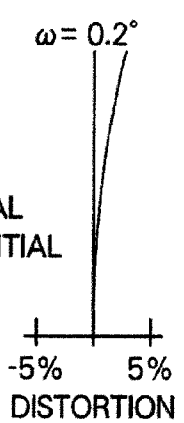
Figure 11L:
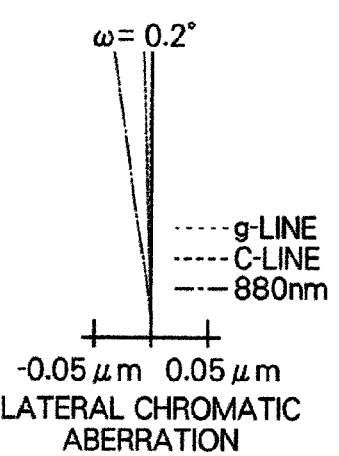
Figures 12A, 12B, 12C, 12D:
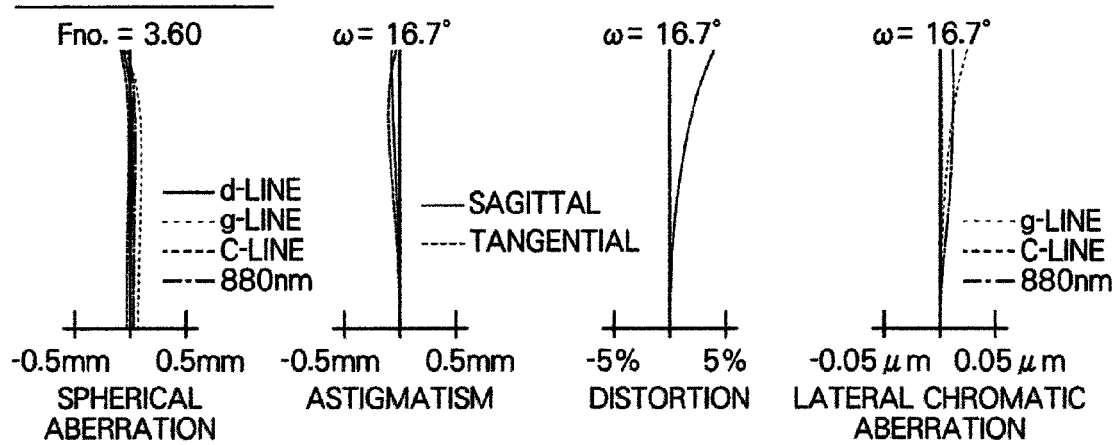
FIGS. 12A through 12L are diagrams illustrating various aberrations of the zoom lens in Example 4 of the present invention.
Figures 12E, 12F, 12G, 12H:
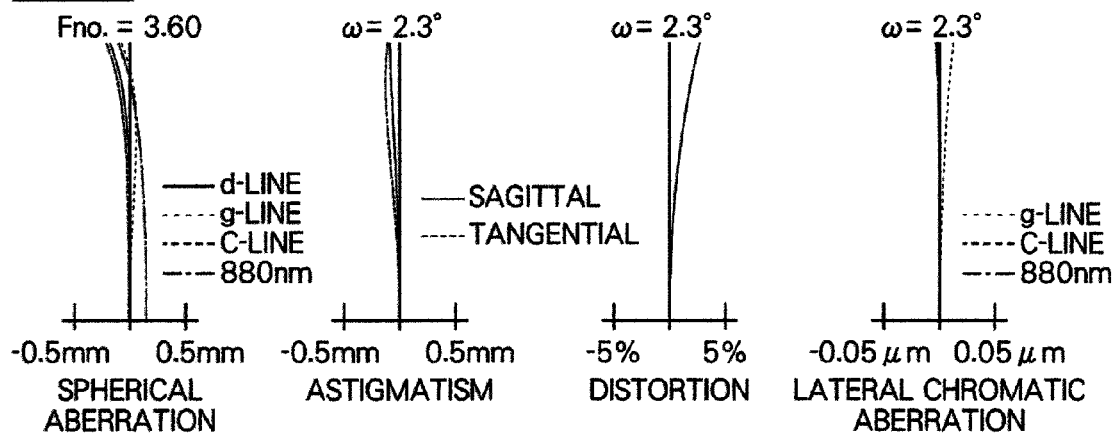
Figures 12I, 12J, 12K, 12L:
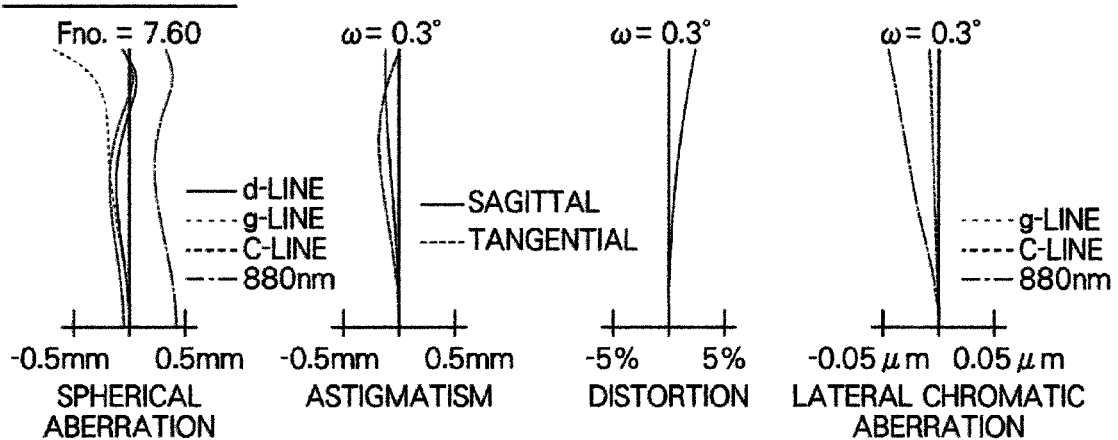

Similarly, FIGS. 5A and 5B are cross sections of a zoom lens in Example 2. FIGS. 6A and 6B are cross sections of a zoom lens in Example 3. FIGS. 7A and 7B are cross sections of a zoom lens in Example 4. FIGS. 8A and 8B are cross sections of a zoom lens in Example 5.

Further, Table 1 shows basic lens data about the zoom lens of Example 1, and Table 2 shows data about zoom of the zoom lens in Example 1. Similarly, Tables 3 through 10 show basic lens data and data about zoom of the zoom lenses in Examples 2 through 5. The meanings of signs in the tables will be described by using the tables for Example 1. The meanings are basically similar to Example 1 in Examples 2 through 5.

In the basic lens data of Table 1, the column Si shows the surface numbers of i-th (i=1, 2, 3, . . . ) surfaces. The surface number of the object-side surface of the most-object-side element is one, and the surface numbers sequentially increase toward the image side. The column Ri shows the radius of curvature of the i-th surface. The column Di shows a distance, on optical axis Z, between the i-th surface and the (i+1)th surface. The column Ndj shows the refractive index of a j-th (j=1, 2, 3, . . . ) optical element with respect to d-line (wavelength is 587.6 nm) when the most-object-side optical element is the first optical element, and the value of j sequentially increases toward the image side. Further the column of vdj shows the Abbe number of the j-th optical element with respect to d-line.

The sign (plus or minus) of a radius of curvature is positive when the surface is convex toward the object side, and negative when the surface is convex toward the image side. Further, the lens data includes aperture stop St, ND filter ND, and optical member GC. In the column of radii of curvature, the term "(APERTURE STOP)" is written on a row corresponding to the aperture stop St. The numerical value at the bottom of the column of distances between surfaces is a distance between a surface of the optical member GC and an image plane.

In the column of distance between surfaces in Table 1, which shows lens data, D8, D16, and D23 are written in the rows of surface distances that change when magnification is changed. D8 is a distance between first lens group G1 and second lens group G2. D16 is a distance between the second lens group G2 and third lens group G3. D23 is a distance between the third lens group G3 and aperture stop St.

Table 2 shows data about zoom. Table 2 shows focal length f of the entire system with respect to d-line, F-number (Fno.), full angle 2ω of view, and the values of D8, D16, and D23 at wide angle end, at middle focal length position, and at telephoto end.

In the following tables, values are rounded to predetermined decimal places. Further, "degree" is used as the unit of angles, and "mm" is used as the unit of lengths. However, optical systems are usable by being proportionally enlarged or by being proportionally reduced. Therefore, other appropriate units may be used for the values.

TABLE 1

EXAMPLE 1: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
| --- | --- | --- | --- | --- |
| 1 | 233.6026 | 2.900 | 1.51633 | 64.14 |
| 2 | 93.1487 | 20.486 | 1.618 | 63.33 |
| 3 | −3833.7762 | 0.650 | | |
| 4 | 191.658 | 2.928 | 1.834807 | 42.71 |
| 5 | 78.1878 | 17.551 | 1.43875 | 94.93 |
| 6 | 635.5842 | 0.120 | | |
| 7 | 84.7498 | 14.210 | 1.43875 | 94.93 |
| 8 | 335.9694 | D8 | | |
| 9 | 175.2338 | 1.304 | 1.882997 | 40.76 |
| 10 | 49.2827 | 8.414 | | |
| 11 | 131.2409 | 1.750 | 1.72342 | 37.95 |
| 12 | 17.9408 | 3.389 | 1.92286 | 18.9 |
| 13 | 34.6022 | 3.273 | | |
| 14 | −56.1166 | 2.733 | 1.846609 | 23.78 |
| 15 | −23.5633 | 1.200 | 1.882997 | 40.76 |
| 16 | 90.8451 | D16 | | |
| 17 | 73.4854 | 4.856 | 1.43875 | 94.93 |
| 18 | −74.1927 | 0.120 | | |
| 19 | 70.0324 | 2.791 | 1.903658 | 31.32 |
| 20 | 34.9293 | 5.792 | 1.43875 | 94.93 |
| 21 | −176.776 | 0.120 | | |
| 22 | 60.0622 | 4.266 | 1.696797 | 55.53 |
| 23 | 165.8201 | D23 | | |
| 24 | ∞ | 0.600 | | |
| | (APERTURE | | | |

TABLE 1-continued

EXAMPLE 1: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
|  | STOP) |  |  |  |
| 25 | ∞ | 0.500 | 1.516798 | 64.2 |
| 26 | ∞ | 1.033 |  |  |
| 27 | 50.5827 | 1.201 | 1.882997 | 40.76 |
| 28 | 17.832 | 3.316 | 1.698947 | 30.13 |
| 29 | 93.2505 | 1.022 |  |  |
| 30 | 62.3932 | 1.223 | 1.620041 | 36.26 |
| 31 | 37.5485 | 2.498 |  |  |
| 32 | 15.9019 | 2.867 | 1.48749 | 70.23 |
| 33 | 34.9466 | 2.761 |  |  |
| 34 | −122.4569 | 1.200 | 1.882997 | 40.76 |
| 35 | 25.8067 | 29.974 |  |  |
| 36 | 107.1766 | 2.823 | 1.6727 | 32.1 |
| 37 | −22.524 | 0.532 |  |  |
| 38 | 60.5761 | 3.656 | 1.48749 | 70.23 |
| 39 | −15.3746 | 1.200 | 1.882997 | 40.76 |
| 40 | −130.3878 | 0.153 |  |  |
| 41 | 23.6367 | 1.200 | 1.785896 | 44.2 |
| 42 | 18.0173 | 10.541 |  |  |
| 43 | −117.9177 | 1.498 | 1.834807 | 42.71 |
| 44 | 19.9485 | 5.361 | 1.496999 | 81.54 |
| 45 | −18.6671 | 5.000 |  |  |
| 46 | ∞ | 1.200 | 1.516329 | 64.1 |
| 47 | ∞ | 17.711 |  |  |

TABLE 2

EXAMPLE 1: DATA ABOUT ZOOM

|  | WIDE ANGLE END | MIDDLE | TELEPHOTO END |
|---|---|---|---|
| f | 16.972 | 128.133 | 967.384 |
| Fno. | 3.6 | 3.601 | 9.042 |
| 2ω | 28.113 | 3.881 | 0.516 |
| D8 | 28.907 | 89.878 | 108.12 |
| D16 | 150.303 | 68.143 | 4.961 |
| D23 | 2.473 | 23.662 | 68.601 |

TABLE 3

EXAMPLE 2: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
| 1 | 294.3607 | 2.900 | 1.51633 | 64.14 |
| 2 | 97.8299 | 18.532 | 1.618 | 63.33 |
| 3 | −1069.1708 | 0.120 |  |  |
| 4 | 192.7874 | 2.900 | 1.834807 | 42.71 |
| 5 | 77.4382 | 16.911 | 1.43875 | 94.93 |
| 6 | 662.8557 | 0.120 |  |  |
| 7 | 81.0121 | 13.454 | 1.43875 | 94.93 |
| 8 | 327.3442 | D8 |  |  |
| 9 | 225.4275 | 1.200 | 1.882997 | 40.76 |
| 10 | 52.5241 | 2.143 |  |  |
| 11 | 148.6586 | 1.200 | 1.72342 | 37.95 |
| 12 | 16.7483 | 4.047 | 1.92286 | 18.9 |
| 13 | 35.1682 | 7.008 |  |  |
| 14 | −44.9107 | 2.058 | 1.846609 | 23.78 |
| 15 | −25.7974 | 1.200 | 1.882997 | 40.76 |
| 16 | 73.8616 | D16 |  |  |
| 17 | 73.8167 | 5.252 | 1.43875 | 94.93 |
| 18 | −69.2646 | 0.120 |  |  |
| 19 | 70.1794 | 1.200 | 1.903658 | 31.32 |
| 20 | 35.2461 | 6.269 | 1.43875 | 94.93 |

TABLE 3-continued

EXAMPLE 2: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
| 21 | −152.5383 | 0.120 |  |  |
| 22 | 60.0153 | 3.078 | 1.696797 | 55.53 |
| 23 | 222.4074 | D23 |  |  |
| 24 | ∞ | 0.600 |  |  |
|  | (APERTURE STOP) |  |  |  |
| 25 | ∞ | 0.500 | 1.516798 | 64.2 |
| 26 | ∞ | 1.439 |  |  |
| 27 | 117.5173 | 1.200 | 1.806098 | 40.92 |
| 28 | 15.6108 | 3.814 | 1.6668 | 33.05 |
| 29 | 149.9867 | 1.260 |  |  |
| 30 | 41.9588 | 1.200 | 1.581439 | 40.75 |
| 31 | 25.7300 | 0.120 |  |  |
| 32 | 13.5546 | 3.421 | 1.48749 | 70.23 |
| 33 | 55.1078 | 3.259 |  |  |
| 34 | −53.4304 | 1.588 | 1.834807 | 42.71 |
| 35 | 28.9919 | 24.471 |  |  |
| 36 | 188.1151 | 2.551 | 1.698947 | 30.13 |
| 37 | −25.4125 | 7.044 |  |  |
| 38 | 23.8037 | 4.104 | 1.48749 | 70.23 |
| 39 | −11.5194 | 1.200 | 1.834807 | 42.71 |
| 40 | 326.0944 | 0.389 |  |  |
| 41 | 29.2000 | 1.200 | 1.785896 | 44.2 |
| 42 | 17.2835 | 11.147 |  |  |
| 43 | −69.3281 | 1.200 | 1.834807 | 42.71 |
| 44 | 41.5446 | 3.480 | 1.43875 | 94.93 |
| 45 | −11.6179 | 5.000 |  |  |
| 46 | ∞ | 1.200 | 1.516329 | 64.1 |
| 47 | ∞ | 9.848 |  |  |

TABLE 4

EXAMPLE 2: DATA ABOUT ZOOM

|  | WIDE ANGLE END | MIDDLE | TELEPHOTO END |
|---|---|---|---|
| f | 16.972 | 128.133 | 967.379 |
| Fno. | 3.6 | 3.6 | 9.051 |
| 2ω | 25.675 | 3.544 | 0.47 |
| D8 | 40.725 | 96.664 | 113.322 |
| D16 | 138.681 | 63.073 | 4.964 |
| D23 | 2.529 | 22.197 | 63.648 |

TABLE 5

EXAMPLE 3: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
| 1 | 208.9115 | 3.309 | 1.522494 | 59.84 |
| 2 | 99.4181 | 18.674 | 1.592399 | 68.3 |
| 3 | −1685.0654 | 1.987 |  |  |
| 4 | 166.830 | 6.211 | 1.834807 | 42.71 |
| 5 | 77.2468 | 18.340 | 1.43875 | 94.93 |
| 6 | 573.8424 | 0.584 |  |  |
| 7 | 77.8302 | 14.794 | 1.43875 | 94.93 |
| 8 | 256.4075 | D8 |  |  |
| 9 | 327.3412 | 3.410 | 1.882997 | 40.76 |
| 10 | 46.7393 | 12.659 |  |  |
| 11 | 885.5311 | 4.395 | 1.701536 | 41.24 |
| 12 | 19.6615 | 2.220 | 1.92286 | 18.9 |
| 13 | 37.7421 | 2.406 |  |  |
| 14 | −52.8041 | 2.776 | 1.846609 | 23.78 |
| 15 | −20.3287 | 1.200 | 1.882997 | 40.76 |

TABLE 5-continued

EXAMPLE 3: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 16 | 131.418 | D16 | | |
| 17 | 73.5018 | 5.836 | 1.43875 | 94.93 |
| 18 | −70.0534 | 1.330 | | |
| 19 | 68.1318 | 1.264 | 1.903658 | 31.32 |
| 20 | 34.9274 | 5.568 | 1.43875 | 94.93 |
| 21 | −146.4106 | 0.299 | | |
| 22 | 60.702 | 2.840 | 1.670029 | 47.23 |
| 23 | 194.5105 | D23 | | |
| 24 | ∞ (APERTURE STOP) | 0.600 | | |
| 25 | ∞ | 0.500 | 1.516798 | 64.2 |
| 26 | ∞ | 0.763 | | |
| 27 | 53.7394 | 1.217 | 1.882997 | 40.76 |
| 28 | 17.2512 | 3.418 | 1.698947 | 30.13 |
| 29 | 95.3722 | 1.045 | | |
| 30 | 56.6147 | 1.290 | 1.620041 | 36.26 |
| 31 | 34.2113 | 2.486 | | |
| 32 | 15.7566 | 2.636 | 1.496999 | 81.54 |
| 33 | 33.0112 | 2.848 | | |
| 34 | −119.5627 | 1.827 | 1.882997 | 40.76 |
| 35 | 28.3539 | 34.965 | | |
| 36 | 96.7319 | 8.089 | 1.6727 | 32.1 |
| 37 | −22.1327 | 0.246 | | |
| 38 | 61.7716 | 3.286 | 1.496999 | 81.54 |
| 39 | −15.2823 | 5.638 | 1.882997 | 40.76 |
| 40 | −271.6175 | 0.120 | | |
| 41 | 22.8343 | 1.242 | 1.785896 | 44.2 |
| 42 | 17.5214 | 17.292 | | |
| 43 | −534.2052 | 1.304 | 1.834807 | 42.71 |
| 44 | 18.6756 | 2.864 | 1.496999 | 81.54 |
| 45 | −18.8972 | 5.000 | | |
| 46 | ∞ | 1.200 | 1.516329 | 64.1 |
| 47 | ∞ | 11.124 | | |

TABLE 6

EXAMPLE 3: DATA ABOUT ZOOM

| | WIDE ANGLE END | MIDDLE | TELEPHOTO END |
|---|---|---|---|
| f | 16.107 | 121.605 | 918.094 |
| Fno. | 3.6 | 3.601 | 8.596 |
| 2ω | 29.397 | 3.997 | 0.469 |
| D8 | 19.605 | 73.2 | 88.871 |
| D16 | 137.121 | 63.235 | 5.626 |
| D23 | 2.178 | 22.469 | 64.407 |

TABLE 7

EXAMPLE 4: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 1 | 215.5379 | 3.171 | 1.48749 | 70.23 |
| 2 | 88.9466 | 20.054 | 1.618 | 63.33 |
| 3 | −9653.7791 | 0.168 | | |
| 4 | 211.6353 | 3.926 | 1.834807 | 42.71 |
| 5 | 74.9054 | 17.360 | 1.43875 | 94.93 |
| 6 | 509.263 | 0.200 | | |
| 7 | 86.9727 | 15.646 | 1.496999 | 81.54 |
| 8 | 288.7008 | D8 | | |
| 9 | 147.2507 | 1.419 | 1.882997 | 40.76 |
| 10 | 51.9298 | 8.297 | | |

TABLE 7-continued

EXAMPLE 4: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 11 | 119.3308 | 4.559 | 1.72342 | 37.95 |
| 12 | 18.3142 | 3.172 | 1.92286 | 18.9 |
| 13 | 33.9007 | 2.964 | | |
| 14 | −55.4132 | 3.997 | 1.846609 | 23.78 |
| 15 | −23.3736 | 1.914 | 1.882997 | 40.76 |
| 16 | 82.8884 | D16 | | |
| 17 | 71.4644 | 5.630 | 1.43875 | 94.93 |
| 18 | −73.375 | 0.315 | | |
| 19 | 67.8967 | 2.026 | 1.903658 | 31.32 |
| 20 | 34.7263 | 12.063 | 1.43875 | 94.93 |
| 21 | −142.0527 | 0.281 | | |
| 22 | 55.2241 | 2.959 | 1.696797 | 55.53 |
| 23 | 134.1399 | D23 | | |
| 24 | ∞ (APERTURE STOP) | 0.600 | | |
| 25 | ∞ | 0.500 | 1.516798 | 64.2 |
| 26 | ∞ | 0.500 | | |
| 27 | 55.8484 | 1.200 | 1.882997 | 40.76 |
| 28 | 15.4202 | 3.322 | 1.698947 | 30.13 |
| 29 | 98.4491 | 1.000 | | |
| 30 | 52.6359 | 1.286 | 1.620041 | 36.26 |
| 31 | 37.2841 | 2.221 | | |
| 32 | 15.9249 | 2.008 | 1.48749 | 70.23 |
| 33 | 32.8095 | 2.315 | | |
| 34 | −141.4064 | 2.913 | 1.882997 | 40.76 |
| 35 | 27.4315 | 27.626 | | |
| 36 | 109.332 | 3.493 | 1.6727 | 32.1 |
| 37 | −22.7693 | 0.323 | | |
| 38 | 71.4068 | 3.753 | 1.48749 | 70.23 |
| 39 | −15.6159 | 2.207 | 1.882997 | 40.76 |
| 40 | −144.2752 | 0.120 | | |
| 41 | 23.7766 | 1.278 | 1.785896 | 44.2 |
| 42 | 18.4809 | 6.274 | | |
| 43 | −136.8969 | 3.720 | 1.834807 | 42.71 |
| 44 | 20.8142 | 4.417 | 1.496999 | 81.54 |
| 45 | −18.5541 | 5.000 | | |
| 46 | ∞ | 1.200 | 1.516329 | 64.1 |
| 47 | ∞ | 21.715 | | |

TABLE 8

EXAMPLE 4: DATA ABOUT ZOOM

| | WIDE ANGLE END | MIDDLE | TELEPHOTO END |
|---|---|---|---|
| f | 14.219 | 107.352 | 810.492 |
| Fno. | 3.6 | 3.599 | 7.596 |
| 2ω | 33.401 | 4.541 | 0.541 |
| D8 | 19.548 | 89.355 | 110.646 |
| D16 | 158.928 | 69.948 | 8.081 |
| D23 | 1.818 | 20.99 | 61.567 |

TABLE 9

EXAMPLE 5: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 1 | 210.9815 | 3.218 | 1.522494 | 59.84 |
| 2 | 102.8806 | 18.559 | 1.569075 | 71.3 |
| 3 | −995.4027 | 1.985 | | |
| 4 | 165.4025 | 7.408 | 1.834807 | 42.71 |
| 5 | 78.124 | 18.093 | 1.43875 | 94.93 |

TABLE 9-continued

EXAMPLE 5: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
| 6 | 592.3707 | 0.510 | | |
| 7 | 77.8117 | 14.387 | 1.43875 | 94.93 |
| 8 | 256.1136 | D8 | | |
| 9 | 391.5615 | 2.461 | 1.882997 | 40.76 |
| 10 | 47.8569 | 12.291 | | |
| 11 | −4632.254 | 3.973 | 1.701536 | 41.24 |
| 12 | 19.5322 | 4.713 | 1.92286 | 18.9 |
| 13 | 38.949 | 2.391 | | |
| 14 | −49.7582 | 2.632 | 1.846609 | 23.78 |
| 15 | −22.7716 | 1.649 | 1.882997 | 40.76 |
| 16 | 136.257 | D16 | | |
| 17 | 73.7514 | 5.870 | 1.43875 | 94.93 |
| 18 | −72.0202 | 1.112 | | |
| 19 | 68.0002 | 1.216 | 1.903658 | 31.32 |
| 20 | 34.8202 | 5.893 | 1.43875 | 94.93 |
| 21 | −142.5488 | 0.452 | | |
| 22 | 60.8314 | 2.823 | 1.670029 | 47.23 |
| 23 | 205.5119 | D23 | | |
| 24 | ∞ (APERTURE STOP) | 0.600 | | |
| 25 | ∞ | 0.500 | 1.516798 | 64.2 |
| 26 | ∞ | 0.606 | | |
| 27 | 57.4733 | 1.200 | 1.882997 | 40.76 |
| 28 | 20.1516 | 3.398 | 1.698947 | 30.13 |
| 29 | 107.9817 | 1.069 | | |
| 30 | 56.5096 | 1.281 | 1.595509 | 39.24 |
| 31 | 33.3219 | 2.572 | | |
| 32 | 16.0258 | 2.586 | 1.592399 | 68.3 |
| 33 | 26.652 | 2.927 | | |
| 34 | −106.0408 | 1.792 | 1.882997 | 40.76 |
| 35 | 28.5321 | 34.535 | | |
| 36 | 101.1469 | 7.551 | 1.6727 | 32.1 |
| 37 | −22.1168 | 0.221 | | |
| 38 | 60.4887 | 3.273 | 1.496999 | 81.54 |
| 39 | −15.3263 | 5.657 | 1.882997 | 40.76 |
| 40 | −268.4097 | 0.120 | | |
| 41 | 22.7552 | 1.253 | 1.785896 | 44.2 |
| 42 | 17.406 | 17.315 | | |
| 43 | −637.7136 | 1.325 | 1.834807 | 42.71 |
| 44 | 18.7193 | 2.870 | 1.496999 | 81.54 |
| 45 | −18.8568 | 5.000 | | |
| 46 | ∞ | 1.200 | 1.516329 | 64.1 |
| 47 | ∞ | 11.622 | | |

TABLE 10

EXAMPLE 5: DATA ABOUT ZOOM

| | WIDE ANGLE END | MIDDLE | TELEPHOTO END |
|---|---|---|---|
| f | 15.671 | 118.31 | 893.222 |
| Fno. | 3.6 | 3.6 | 8.351 |
| 2ω | 30.093 | 4.099 | 0.486 |
| D8 | 18.02 | 71.956 | 87.705 |
| D16 | 138.092 | 64.077 | 7.047 |
| D23 | 2.097 | 22.176 | 63.456 |

Table 11 shows values corresponding to formulas (1) through (6) with respect to the zoom lenses in Examples 1 through 5. Table 11 shows values with respect to d-line.

TABLE 11

| | EXAMPLE 1 | EXAMPLE 2 | EXAMPLE 3 | EXAMPLE 4 | EXAMPLE 5 |
|---|---|---|---|---|---|
| (1) fG1/ft | 0.178 | 0.176 | 0.168 | 0.223 | 0.171 |
| (2) vn | 53.4 | 53.4 | 51.3 | 56.5 | 51.3 |
| (3) vp | 84.4 | 84.4 | 86.1 | 79.9 | 87.1 |
| (4) Δv1 | 0.8 | 0.8 | 8.5 | 6.9 | 11.5 |
| (5) Δv2 | 52.2 | 52.2 | 52.2 | 52.2 | 52.2 |
| (6) f4a/f4b | 3.03 | 3.01 | 2.06 | 2.42 | 2.67 |
| fG1 | 172.309 | 169.958 | 154.659 | 180.521 | 152.962 |
| f4a | −157.60 | −154.58 | −122.35 | −130.86 | −142.27 |
| f4b | −52.08 | −51.43 | −59.38 | −54.07 | −53.35 |

FIGS. 9A through 9D are diagrams illustrating various aberrations (spherical aberration, astigmatism, distortion, and lateral chromatic aberration, respectively) of the zoom lens in Example 1 at wide angle end. FIGS. 9E through 9H are diagrams illustrating various aberrations (spherical aberration, astigmatism, distortion, and lateral chromatic aberration, respectively) of the zoom lens in Example 1 at middle focal length position. FIGS. 9I through 9L are diagrams illustrating various aberrations (spherical aberration, astigmatism, distortion, and lateral chromatic aberration, respectively) of the zoom lens in Example 1 at telephoto end.

The diagrams illustrate aberrations with respect to d-line. Further, the diagrams of spherical aberrations illustrate aberrations with respect to g-line (wavelength is 435.8 nm), C-line (wavelength is 656.3 nm), and the wavelength of 880 nm. Further, the diagrams of lateral chromatic aberrations illustrate aberrations with respect to g-line, C-line, and the wavelength of 880 nm. Further, in the diagrams of astigmatism, aberrations with respect to a sigittal direction are represented by solid lines, and aberrations with respect to a tangential direction are represented by dotted lines. In the diagrams of spherical aberrations, the sign "Fno." represents an F-number, and in the other diagrams, ω represents a half angle of view.

Similarly, FIGS. 10A through 10L are diagrams illustrating various aberrations of the zoom lens in Example 2 at wide angle end, at middle focal length position, and at telephoto end. FIGS. 11A through 11L are diagrams illustrating various aberrations of the zoom lens in Example 3 at wide angle end, at middle focal length position, and at telephoto end. FIGS. 12A through 12L are diagrams illustrating various aberrations of the zoom lens in Example 4 at wide angle end, at middle focal length position, and at telephoto end. FIGS. 13A through 13L are diagrams illustrating various aberrations of the zoom lens in Example 5 at wide angle end, at middle focal length position, and at telephoto end. All of the diagrams of aberrations illustrate aberrations when a distance to an object is 50 m.

The zoom lenses in Examples 1 through 5 have high variable magnification ratios of approximately 57 times. While the zoom lenses are relatively compact as high variable magnification optical systems, the zoom lenses can achieve high optical performance in which aberrations are corrected in an excellent manner in a wide wavelength band of visible light to a near-infrared region through the whole variable magnification range.

Figure 14A:
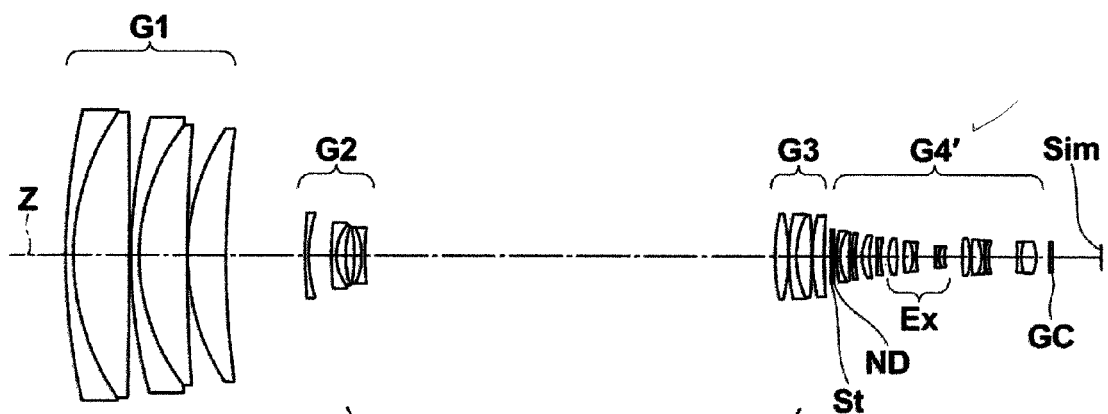
FIG. 14A is a cross section illustrating a zoom lens in Example 1 of the present invention at wide angle end when an extender is inserted into the zoom lens.
Figure 14B:
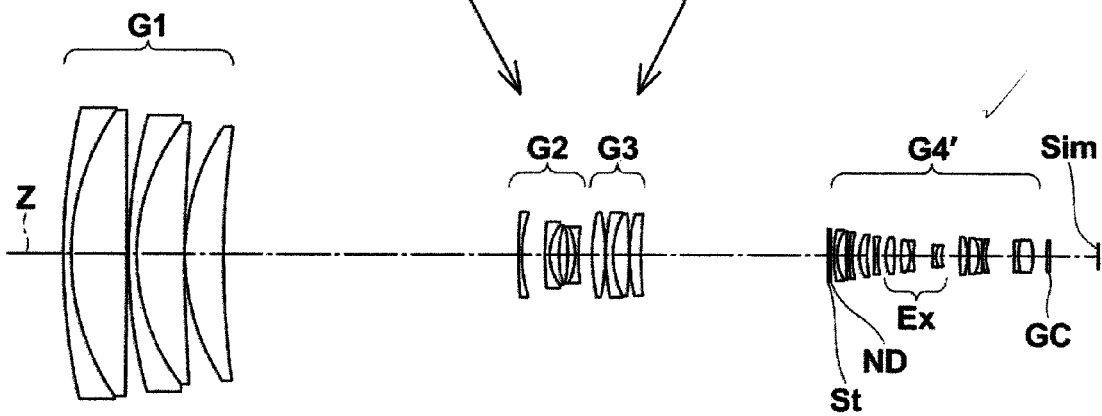
FIG. 14B is a cross section illustrating a zoom lens in Example 1 of the present invention at telephoto end when an extender is inserted into the zoom lens.
Figure 15A:
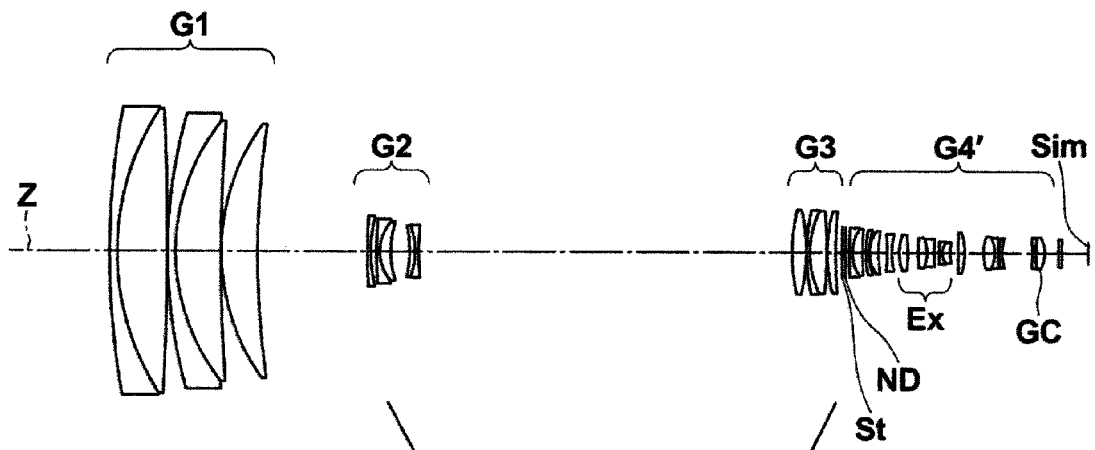
FIG. 15A is a cross section illustrating a zoom lens in Example 2 of the present invention at wide angle end when an extender is inserted into the zoom lens.
Figure 15B:
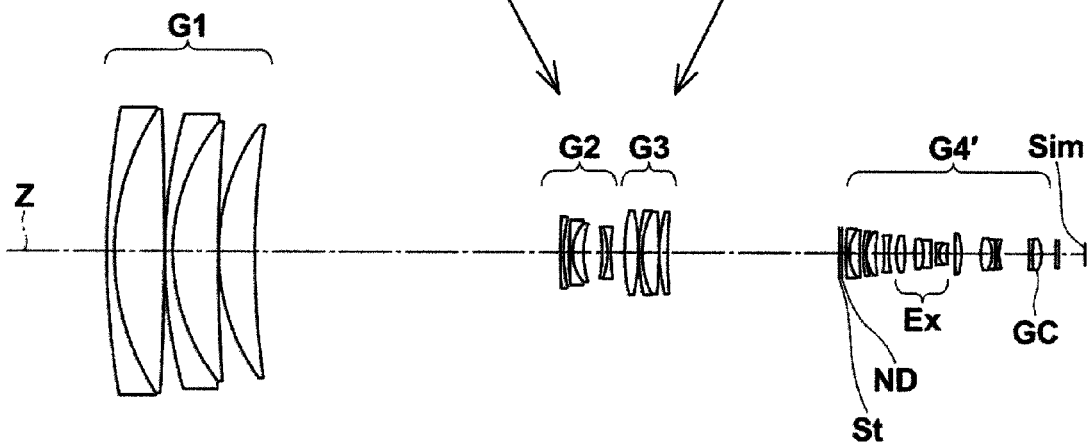
FIG. 15B is a cross section illustrating a zoom lens in Example 2 of the present invention at telephoto end when an extender is inserted into the zoom lens.

FIGS. 14A and 14B are cross sections of the zoom lens in Example 1 when extender Ex having a magnification (multiplication) of 2 times is inserted. FIGS. 15A and 15B are cross sections of the zoom lens in Example 2 when extender Ex having a magnification (multiplication) of 2 times is inserted. In each of the zoom lenses illustrated in FIGS. 14A, 14B, 15A and 15B, the extender Ex is inserted immediately on the image side of the second negative lens group G4b in the fourth lens group G4. The fourth lens group is represented by the sign "G4'" when the extender Ex is inserted into the fourth lens group G4.

Table 12 shows basic lens data of the zoom lens in Example 1 when an extender is inserted. Table 13 shows data about zoom of the zoom lens in Example 1 when an extender is inserted. Table 14 shows basic lens data of the zoom lens in Example 2 when an extender is inserted. Table 15 shows data about zoom of the zoom lens in Example 2 when an extender is inserted. The meanings of the signs in Tables 12 through 15 are similar to those of Example 1, which were described already.

TABLE 12

EXAMPLE 1 + EXTENDER: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 1 | 233.6026 | 2.900 | 1.51633 | 64.14 |
| 2 | 93.1487 | 20.486 | 1.618 | 63.33 |
| 3 | −3833.7762 | 0.650 | | |
| 4 | 191.658 | 2.928 | 1.834807 | 42.71 |
| 5 | 78.1878 | 17.551 | 1.43875 | 94.93 |
| 6 | 635.5842 | 0.120 | | |
| 7 | 84.7498 | 14.210 | 1.43875 | 94.93 |
| 8 | 335.9694 | D8 | | |
| 9 | 175.2338 | 1.304 | 1.882997 | 40.76 |
| 10 | 49.2827 | 8.414 | | |
| 11 | 131.2409 | 1.750 | 1.72342 | 37.95 |
| 12 | 17.9408 | 3.389 | 1.92286 | 18.9 |
| 13 | 34.6022 | 3.273 | | |
| 14 | −56.1166 | 2.733 | 1.846609 | 23.78 |
| 15 | −23.5633 | 1.200 | 1.882997 | 40.76 |
| 16 | 90.8451 | D16 | | |
| 17 | 73.4854 | 4.856 | 1.43875 | 94.93 |
| 18 | −74.1927 | 0.120 | | |
| 19 | 70.0324 | 2.791 | 1.903658 | 31.32 |
| 20 | 34.9293 | 5.792 | 1.43875 | 94.93 |
| 21 | −176.776 | 0.120 | | |
| 22 | 60.0622 | 4.266 | 1.696797 | 55.53 |
| 23 | 165.8201 | D23 | | |
| 24 | ∞ (APERTURE STOP) | 0.600 | | |
| 25 | ∞ | 0.500 | 1.516798 | 64.2 |
| 26 | ∞ | 1.033 | | |
| 27 | 50.5827 | 1.201 | 1.882997 | 40.76 |
| 28 | 17.832 | 3.316 | 1.698947 | 30.13 |
| 29 | 93.2505 | 1.022 | | |
| 30 | 62.3932 | 1.223 | 1.620041 | 36.26 |
| 31 | 37.5485 | 2.498 | | |
| 32 | 15.9019 | 2.867 | 1.48749 | 70.23 |
| 33 | 34.9466 | 2.761 | | |
| 34 | −122.4569 | 1.200 | 1.882997 | 40.76 |
| 35 | 25.8067 | 3.000 | | |
| 36 | 18.2704 | 3.195 | 1.496999 | 81.54 |
| 37 | −59.5365 | 2.429 | | |
| 38 | 61.1442 | 3.307 | 1.808095 | 22.76 |
| 39 | −12.7863 | 1.201 | 1.84666 | 23.78 |
| 40 | 32.5616 | 7.022 | | |
| 41 | −678.118 | 1.200 | 1.788001 | 47.37 |
| 42 | 7.1441 | 2.078 | 1.84666 | 23.78 |
| 43 | 14.2896 | 6.542 | | |
| 44 | 107.1766 | 2.823 | 1.6727 | 32.1 |
| 45 | −22.524 | 0.532 | | |
| 46 | 60.5761 | 3.656 | 1.48749 | 70.23 |
| 47 | −15.3746 | 1.200 | 1.882997 | 40.76 |
| 48 | −130.3878 | 0.153 | | |
| 49 | 23.6367 | 1.200 | 1.785896 | 44.2 |
| 50 | 18.0173 | 10.541 | | |
| 51 | −117.9177 | 1.498 | 1.834807 | 42.71 |
| 52 | 19.9485 | 5.361 | 1.496999 | 81.54 |
| 53 | −18.6671 | 5.000 | | |
| 54 | ∞ | 1.200 | 1.516329 | 64.1 |
| 55 | ∞ | 17.742 | | |

TABLE 13

EXAMPLE 1 + EXTENDER: DATA ABOUT ZOOM

| | WIDE ANGLE END | MIDDLE | TELEPHOTO END |
|---|---|---|---|
| f | 33.171 | 250.435 | 1890.744 |
| Fno. | 7.059 | 7.061 | 17.495 |
| 2ω | 15.005 | 2.008 | 0.266 |
| D8 | 28.907 | 89.878 | 108.12 |
| D16 | 150.303 | 68.143 | 4.961 |
| D23 | 2.473 | 23.662 | 68.601 |

TABLE 14

EXAMPLE 2 + EXTENDER: BASIC LENS DATA

| Si (SURFACE NUMBER) | Ri (CURVATURE OF RADIUS) | Di (DISTANCE BETWEEN SURFACES) | Ndj (REFRACTIVE INDEX) | νdj (Abbe NUMBER) |
|---|---|---|---|---|
| 1 | 294.3607 | 2.900 | 1.51633 | 64.14 |
| 2 | 97.8299 | 18.532 | 1.618 | 63.33 |
| 3 | −1069.1708 | 0.120 | | |
| 4 | 192.7874 | 2.900 | 1.834807 | 42.71 |
| 5 | 77.4382 | 16.911 | 1.43875 | 94.93 |
| 6 | 662.8557 | 0.120 | | |
| 7 | 81.0121 | 13.454 | 1.43875 | 94.93 |
| 8 | 327.3442 | D8 | | |
| 9 | 225.4275 | 1.200 | 1.882997 | 40.76 |
| 10 | 52.5241 | 2.143 | | |
| 11 | 148.6586 | 1.200 | 1.72342 | 37.95 |
| 12 | 16.7483 | 4.047 | 1.92286 | 18.9 |
| 13 | 35.1682 | 7.008 | | |
| 14 | −44.9107 | 2.058 | 1.846609 | 23.78 |
| 15 | −25.7974 | 1.200 | 1.882997 | 40.76 |
| 16 | 73.8616 | D16 | | |
| 17 | 73.8167 | 5.252 | 1.43875 | 94.93 |
| 18 | −69.2646 | 0.120 | | |
| 19 | 70.1794 | 1.200 | 1.903658 | 31.32 |
| 20 | 35.2461 | 6.269 | 1.43875 | 94.93 |
| 21 | −152.5383 | 0.120 | | |
| 22 | 60.0153 | 3.078 | 1.696797 | 55.53 |
| 23 | 222.4074 | D23 | | |
| 24 | ∞ (APERTURE STOP) | 0.600 | | |
| 25 | ∞ | 0.500 | 1.516798 | 64.2 |
| 26 | ∞ | 1.439 | | |
| 27 | 117.5173 | 1.200 | 1.806098 | 40.92 |
| 28 | 15.6108 | 3.814 | 1.6668 | 33.05 |
| 29 | 149.9867 | 1.260 | | |
| 30 | 41.9588 | 1.200 | 1.581439 | 40.75 |
| 31 | 25.73 | 0.120 | | |
| 32 | 13.5546 | 3.421 | 1.48749 | 70.23 |
| 33 | 55.1078 | 3.259 | | |
| 34 | −53.4304 | 1.588 | 1.834807 | 42.71 |
| 35 | 28.9919 | 2.738 | | |
| 36 | 19.1928 | 3.204 | 1.496999 | 81.54 |
| 37 | −54.8105 | 3.708 | | |
| 38 | 49.6926 | 3.395 | 1.808372 | 24.61 |
| 39 | −13.6858 | 2.668 | 1.84666 | 23.78 |
| 40 | 93.0784 | 1.863 | | |
| 41 | −97.2381 | 1.083 | 1.882997 | 40.76 |
| 42 | 5.7136 | 2.887 | 1.84666 | 23.78 |

TABLE 14-continued

EXAMPLE 2 + EXTENDER: BASIC LENS DATA

| Si (SURFACE NUMBER) | Ri (CURVATURE OF RADIUS) | Di (DISTANCE BETWEEN SURFACES) | Ndj (REFRACTIVE INDEX) | vdj (Abbe NUMBER) |
|---|---|---|---|---|
| 43 | 13.542 | 2.926 | | |
| 44 | 188.1151 | 2.551 | 1.698947 | 30.13 |
| 45 | −25.4125 | 7.044 | | |
| 46 | 23.8037 | 4.104 | 1.48749 | 70.23 |
| 47 | −11.5194 | 1.200 | 1.834807 | 42.71 |
| 48 | 326.0944 | 0.389 | | |
| 49 | 29.2 | 1.200 | 1.785896 | 44.2 |
| 50 | 17.2835 | 11.147 | | |
| 51 | −69.3281 | 1.200 | 1.834807 | 42.71 |
| 52 | 41.5446 | 3.480 | 1.43875 | 94.93 |
| 53 | −11.6179 | 5.000 | | |
| 54 | ∞ | 1.200 | 1.516329 | 64.1 |
| 55 | ∞ | 9.889 | | |

TABLE 15

EXAMPLE 2 + EXTENDER: DATA ABOUT ZOOM

| | WIDE ANGLE END | MIDDLE | TELEPHOTO END |
|---|---|---|---|
| f | 32.946 | 248.734 | 1877.898 |
| Fno. | 7.038 | 7.019 | 17.545 |
| 2ω | 13.727 | 1.835 | 0.243 |
| D8 | 40.725 | 96.664 | 113.322 |
| D16 | 138.681 | 63.073 | 4.964 |
| D23 | 2.529 | 22.197 | 63.648 |

Figure 16:
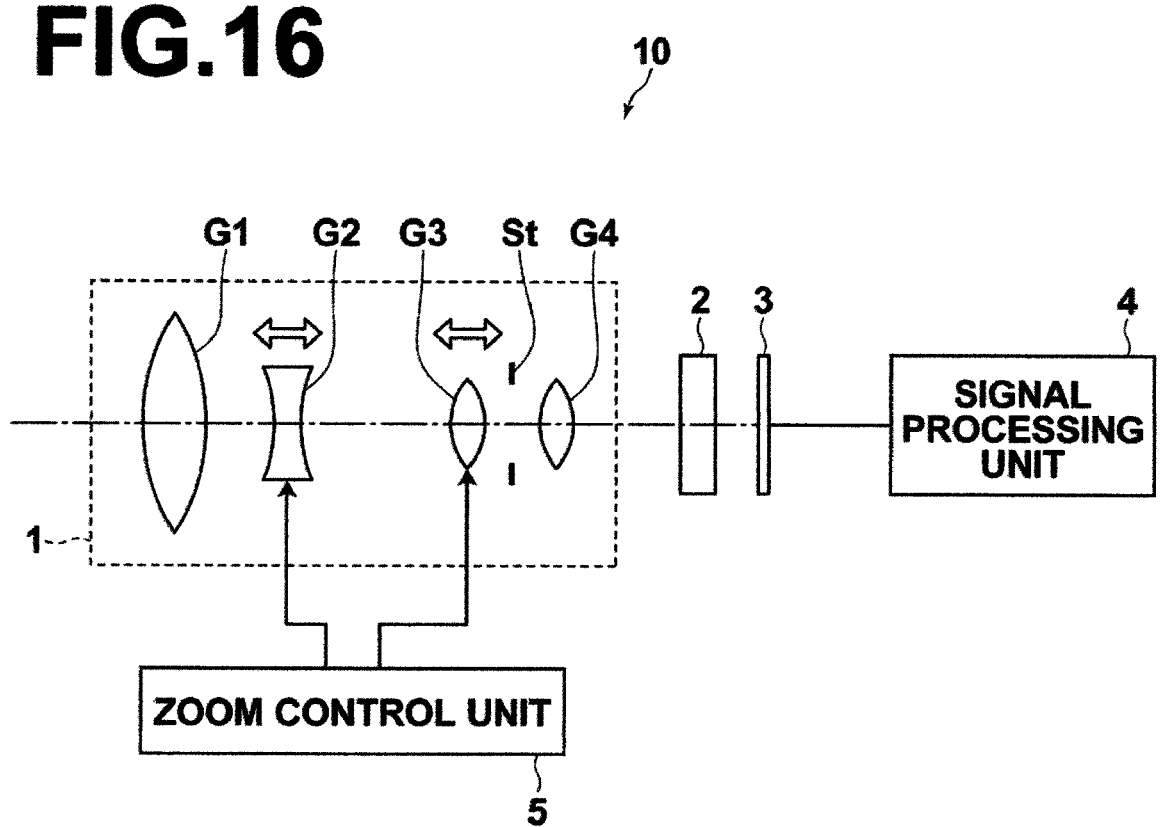
FIG. 16 is a schematic diagram illustrating the configuration of an imaging apparatus according to an embodiment of the present invention.

FIG. 16 is a schematic diagram illustrating the configuration of an example of an imaging apparatus according to an embodiment of the present invention. The imaging apparatus uses a zoom lens according to an embodiment of the present invention. The imaging apparatus is, for example, a surveillance camera, a video camera, an electronic still camera, or the like.

An imaging apparatus 10 illustrated in FIG. 16 includes a zoom lens 1, a filter 2, an imaging device 3, a signal processing unit 4, and a zoom control unit 5. The filter 2 is arranged on the image side of the zoom lens 1. The imaging device 3 performs imaging on an image of a subject formed by the zoom lens 1. The signal processing unit 4 performs operation processing on signals output from the imaging device 3. The zoom control unit 5 is provided to change the magnification of the zoom lens 1.

The zoom lens 1 includes first lens group G1 having positive refractive power, second lens group G2 having negative refractive power, third lens group G3 having positive refractive power, aperture stop St and fourth lens group G4 having positive refractive power. In FIG. 16, these lens groups are conceptually illustrated. The imaging device 3 converts an optical image formed by the zoom lens 1 into electrical signals. The imaging device 3 is placed in such a manner that the imaging surface of the imaging device 3 and the image plane of the zoom lens 1 become the same. For example, a CCD, a CMOS or the like may be used as the imaging device 3.

So far, the present invention has been described by using embodiments and examples. However, the present invention is not limited to the embodiments and the examples, and various modifications are possible. For example, values, such as the radius of curvature of each lens element, distances between surfaces, refractive indices and Abbe numbers, are not limited to the values in the numerical examples, but may be other values.

What is claimed is:

1. A zoom lens comprising:
a first lens group having positive refractive power;
a second lens group having negative refractive power;
a third lens group having positive refractive power; and
a fourth lens group having positive refractive power, which are arranged in this order from the object side of the zoom lens,
wherein the focal length of the entire system of the zoom lens is changed by moving, along the optical axis of the zoom lens, the second lens group and the third lens group in such a manner to change a distance therebetween, and
wherein the first lens group includes two cemented lenses, each composed of a negative meniscus lens, which is a negative lens, and a positive lens cemented together in this order from the object side, and a positive lens, and the two cemented lenses and the positive lens being arranged in this order from the object side, and
wherein the following formula (1) is satisfied:

$$0.14 < fG1/ft < 0.26 \qquad (1),\text{where}$$

fG1 is the focal length of the first lens group, and
ft is the focal length of the entire system at telephoto end.

2. A zoom lens, as defined in claim 1, wherein the following formulas (2) and (3) are satisfied:

$$vn > 48 \qquad (2); \text{and}$$

$$vp > 75 \qquad (3),\text{where}$$

vn is an average value of the Abbe numbers of all of negative lenses included in the first lens group with respect to d-line, and
vp is an average value of the Abbe numbers of all of positive lenses included in the first lens group with respect to d-line.

3. A zoom lens, as defined in claim 1, wherein when a most-object-side cemented lens of the cemented lenses, each composed of a negative meniscus lens and a positive lens cemented together, in the first lens group is a first cemented lens, and a cemented lens located at a second position from the object side of the cemented lenses in the first lens group is a second cemented lens, the following formulas (4) and (5) are satisfied:

$$\Delta v1 < 11 \qquad (4); \text{and}$$

$$\Delta v2 > 50 \qquad (5),\text{where}$$

Δv1 is the absolute value of a difference between the Abbe numbers of the negative meniscus lens and the positive lens constituting the first cemented lens with respect to d-line, and
Δv2 is the absolute value of a difference between the Abbe numbers of the negative meniscus lens and the positive lens constituting the second cemented lens with respect to d-line.

4. A zoom lens, as defined in claim 1, wherein the first lens group consists of five lenses that are the cemented lens composed of the negative meniscus lens and the positive lens cemented together in this order from the object side, the cemented lens composed of the negative meniscus lens and the positive lens cemented together in this order from the object side, and the positive lens, and the two cemented lenses and the positive lens being arranged in this order from the object side.

5. A zoom lens, as defined in claim 1, wherein the fourth lens group includes a first negative lens group and a second negative lens group that is arranged on the image side of the first negative lens group, and wherein the first negative lens group includes a positive lens and a negative lens, and wherein the second negative lens group is moved in a direction perpendicular to the optical axis to compensate for a shake blur in a photography image, and wherein the following formula (6) is satisfied:

$$1.5 < f4a/f4b < 3.5 \qquad (6),\text{ where}$$

f4a is the focal length of the first negative lens group, and f4b is the focal length of the second negative lens group.

6. A zoom lens, as defined in claim 1, wherein the second lens group has 3-group 5-element construction in which a negative meniscus lens, a cemented lens composed of a negative lens and a positive lens cemented together in this order from the object side, and a cemented lens composed of a positive lens and a negative lens cemented together in this order from the object side are arranged in this order from the object side.

7. A zoom lens, as defined in claim 1, wherein an extender that changes the focal length of the entire system of the zoom lens toward the long focus side by being inserted into the optical path of the zoom lens is arranged, in a removable manner, immediately on the image side of the second negative lens group in the fourth lens group.

8. An imaging apparatus comprising:
a zoom lens as defined in claim 1.

* * * * *